US006616845B2

(12) United States Patent
Shechter et al.

(10) Patent No.: US 6,616,845 B2
(45) Date of Patent: Sep. 9, 2003

(54) METHOD AND APPARATUS FOR BIOLOGICAL WASTEWATER TREATMENT

(75) Inventors: Ronen Shechter, Ramat Tivon (IL); Eytan Levy, Rosh Haa'in (IL)

(73) Assignee: Aqwise Wise Water Technologies, Ltd., Netanya (IL)

( * ) Notice: Subject to any disclaimer, the term of this patent is extended or adjusted under 35 U.S.C. 154(b) by 0 days.

(21) Appl. No.: 09/866,886

(22) Filed: May 29, 2001

(65) Prior Publication Data

US 2002/0179526 A1 Dec. 5, 2002

(51) Int. Cl.[7] ................................................. C02F 3/06
(52) U.S. Cl. ...................... 210/616; 210/629; 210/150; 210/194; 210/195.1
(58) Field of Search ................................. 210/150, 151, 210/194, 195.1, 202, 220, 258, 616, 620, 629, 903

(56) References Cited

U.S. PATENT DOCUMENTS

| 1,790,975 | A | | 2/1931 | Dallas et al. | |
|---|---|---|---|---|---|
| 3,133,017 | A | | 5/1964 | Lambeth | 210/5 |
| 4,045,344 | A | | 8/1977 | Yokota | 210/106 |
| 4,137,171 | A | | 1/1979 | Yokata | 210/150 |
| 4,179,366 | A | * | 12/1979 | Kaelin | |
| 4,188,289 | A | | 2/1980 | Besik | 210/7 |
| 4,231,863 | A | | 11/1980 | Sutphin | 210/615 |
| 4,256,573 | A | | 3/1981 | Shimodaira et al. | 210/618 |
| 4,374,730 | A | | 2/1983 | Braha et al. | 210/608 |
| 4,394,268 | A | | 7/1983 | Reid | 210/628 |
| 4,454,038 | A | | 6/1984 | Shimodaira et al. | 210/150 |
| 4,521,311 | A | | 6/1985 | Fuchs et al. | 210/616 |
| 4,566,971 | A | | 1/1986 | Reimann et al. | 210/616 |
| 4,599,174 | A | | 7/1986 | McDowell | 210/614 |
| 4,810,377 | A | | 3/1989 | Kato et al. | 210/150 |
| 4,820,415 | A | | 4/1989 | Reischl | 210/616 |
| 4,839,053 | A | | 6/1989 | Tharp | 210/616 |
| 4,999,103 | A | * | 3/1991 | Bogart | 210/151 |
| 5,030,353 | A | | 7/1991 | Stuth | 210/615 |
| 5,041,216 | A | | 8/1991 | Henzler et al. | 210/151 |

(List continued on next page.)

FOREIGN PATENT DOCUMENTS

| EP | 0 025 309 | 3/1981 |
|---|---|---|
| FR | 2707183 | 1/1995 |
| WO | WO 97/13727 | 4/1997 |

OTHER PUBLICATIONS

"Kaldnes™ Moving Bed Biofilm Reactor", 1998, The PURAC Group, a Division of the Anglian Water International Ltd., UK, 12 pages. (http://www.purac.co.uk/).

"The Kaldnes™ Moving Bed Process", 1998; The PURAC Group, a Division of the Anglian Water International Ltd., UK, 9 pages.

"The Natrix Process", 1998, The PURAC Group, a Division of the Anglian Water International Ltd., UK, one page.

"The Waterlink Moving Bed Biofilm Reactor Process", 2000 Biological Wastewater Systems, Mass., U.S.A., 6 pages. (http://www.waterlink.com/mts/sampleind.html).

(List continued on next page.)

Primary Examiner—Christopher Upton
(74) Attorney, Agent, or Firm—Ladas and Parry

(57) ABSTRACT

A method and apparatus for retrofitting existing waste water treatment facilities having at least one existing basin including installing generally vertical partitions at spaced locations in the at least one existing basin in order to divide the at least one existing basin into a plurality of treatment stage regions, installing at least one air lift in each of the plurality of treatment stage regions, loading each treatment stage regions with a quantity of floatable porous particles, supplying waste water to at least one of the plurality of treatment stage regions and allowing the waste water, but generally not the particles, to flow from at least one of the plurality of treatment stage regions to at least another of the plurality of treatment stage regions and operating the at least one air lift in each of the plurality of treatment stage regions to provide aerobic waste water flow therein in operative engagement with the floatable porous particles.

140 Claims, 20 Drawing Sheets

U.S. PATENT DOCUMENTS

| | | | | |
|---|---|---|---|---|
| 5,080,793 A | * | 1/1992 | Urlings | 210/510 |
| 5,192,442 A | * | 3/1993 | Piccirillo et al. | 210/616 |
| 5,200,081 A | | 4/1993 | Stuth | 210/615 |
| 5,202,027 A | | 4/1993 | Stuth | 210/615 |
| 5,252,231 A | | 10/1993 | Capdeville | 210/794 |
| 5,458,779 A | | 10/1995 | Odegaard | 210/616 |
| 5,554,289 A | | 9/1996 | Grounds | 210/607 |
| 5,698,094 A | | 12/1997 | Abdellatif et al. | 210/151 |
| 5,902,484 A | * | 5/1999 | Timpany | 210/629 |
| 6,036,863 A | | 3/2000 | Brockdorff | 210/616 |
| 6,077,424 A | * | 6/2000 | Katsukura et al. | 210/616 |
| 6,136,194 A | * | 10/2000 | Vogel et al. | 210/150 |
| 6,210,578 B1 | * | 4/2001 | Sagastume et al. | 210/151 |

OTHER PUBLICATIONS

"AMB Bio Media", 2001; EEC High–Speed Bio Tec, 6 pages. (http://www.eecusa.com).

D.S. Parker et al., "A New Process For Enriching Nitrifiers In Activated Sludge Through Separate Heterotrophic Wasting From Biofilm Carriers", Brown and Caldwell, P.O. Box 8045 Walnut Creek, CA 94596–1220, *WEFTEC 2000*, Copyright 2000 Water Environment Federation, 21 pages.

C. H. Johnson et al., "Pilot Study To Full Scale Treatment— The Moving Bed Biofilm Reactor Experience At The Phillips 66 Borger Refinery", *WEFTEC 2000*, Copyright 2000 Water Environment Federation, 15 pages.

B. Rusten et al., "Upgrading To Nitrogen Removal With The KMT Moving Bed Biofilm Process", *Wat. Sci. Tech.*, vol. 29, No. 12, 1994, pp. 185–195.

N. Sunner et al., "The Two Stage Moving Bed/Activated Sludge Process, An Effective Solution For High Strength Wastes", *Water and Environmental Management*, vol. 13, No. 5, Oct., 1999, 10 pages.

A. AEsøy et al., "Upgrading Wastewater Treatment Plants By The Use Of Biofilm Carriers, Oxygen Addition And Pre–Treatment In The Sewer Network", *Water Science & Technology*, vol. 37, No. 9, 1998, 9 pages.

D.G. Karamanev, "Application Of Inverse Fluidization In Wastewater Treatment: From Laboratory To Full–Scale Bioreactors", *Environmental Progress*, vol. 15, No. 3, pp. 194–196, Fall 1996.

ConorPac Media™ Floating Plastic Media, May 2000, one page.

BioMatrix Integrated Fixed–film Activated Sludge (IFAS) System, BioMatrix Technologies, Inc., Jul. 2000, one page.

"The CIRCO® Reactor: The Aerobic Compact Answer To Higher Effluent Quality", Apr. 2001, one page.

* cited by examiner

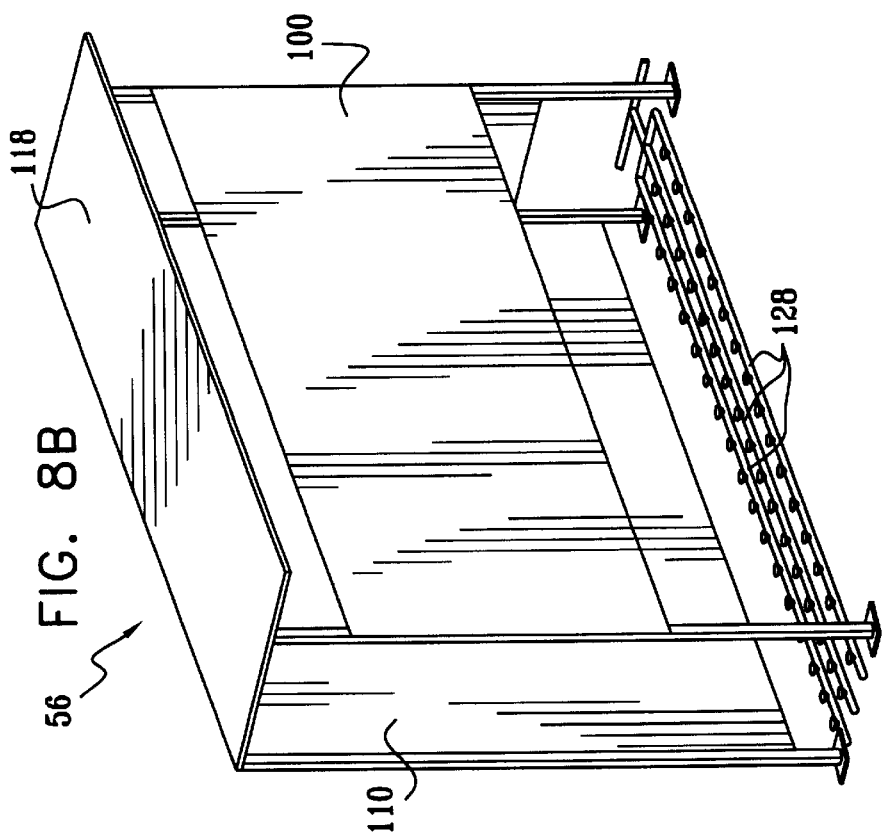
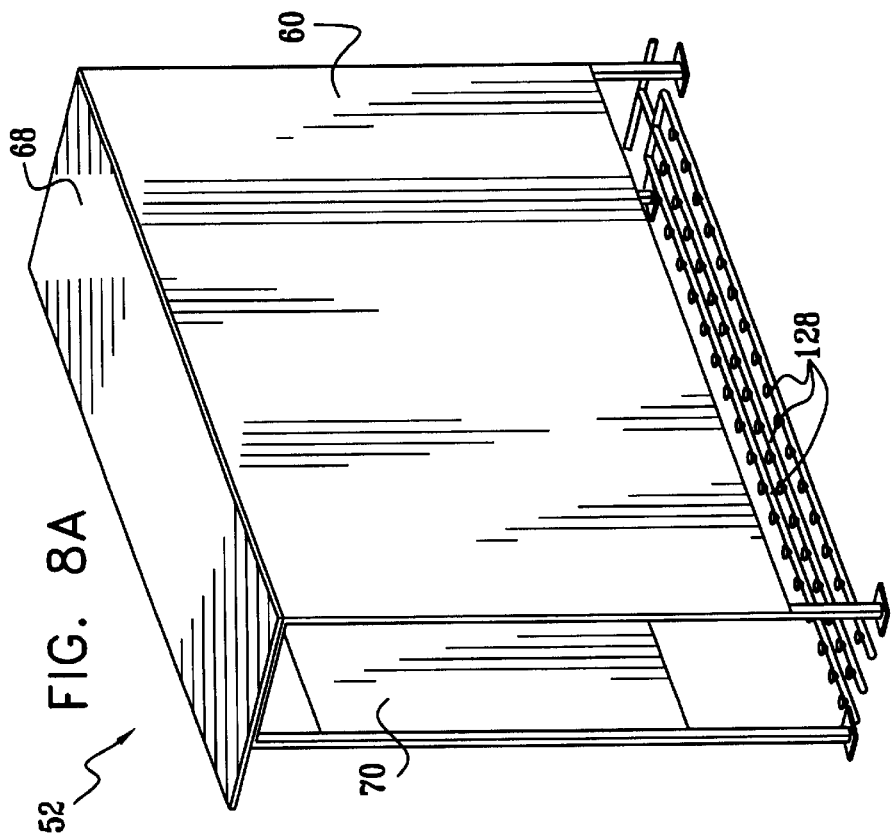

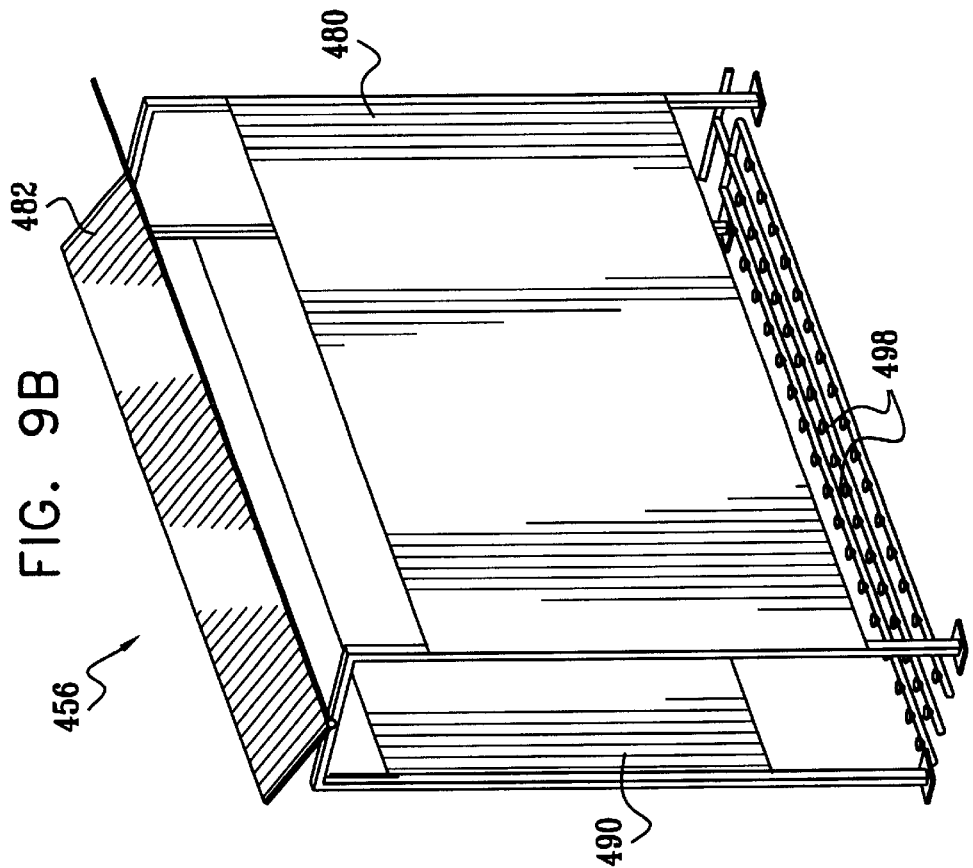
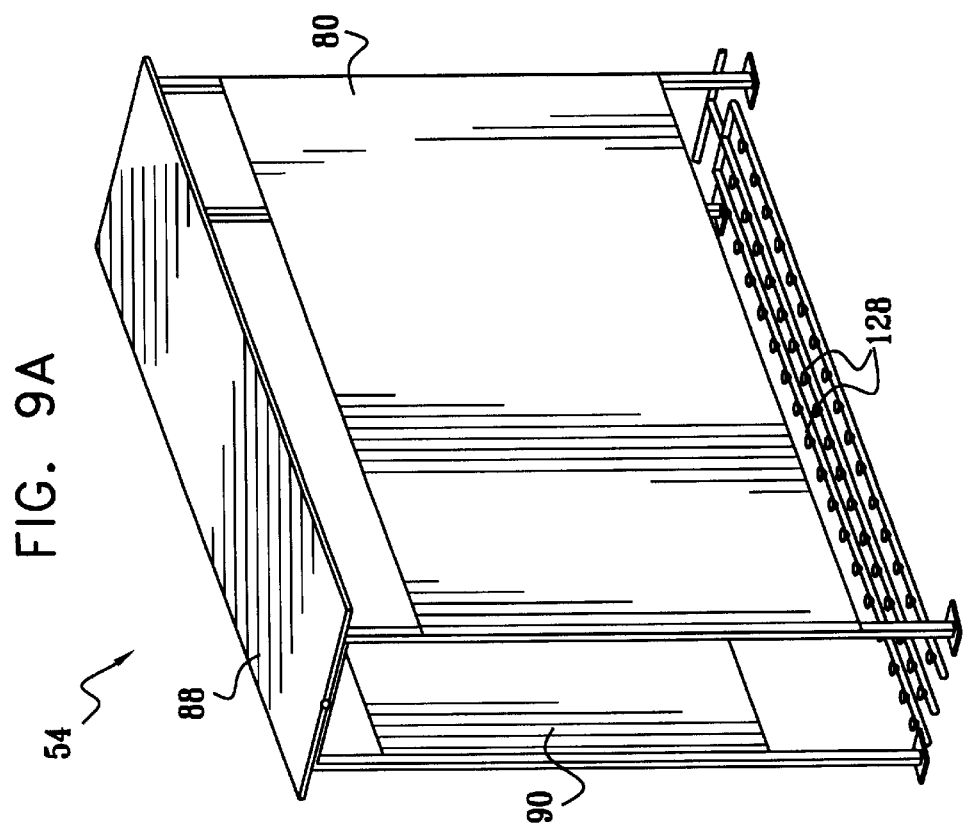

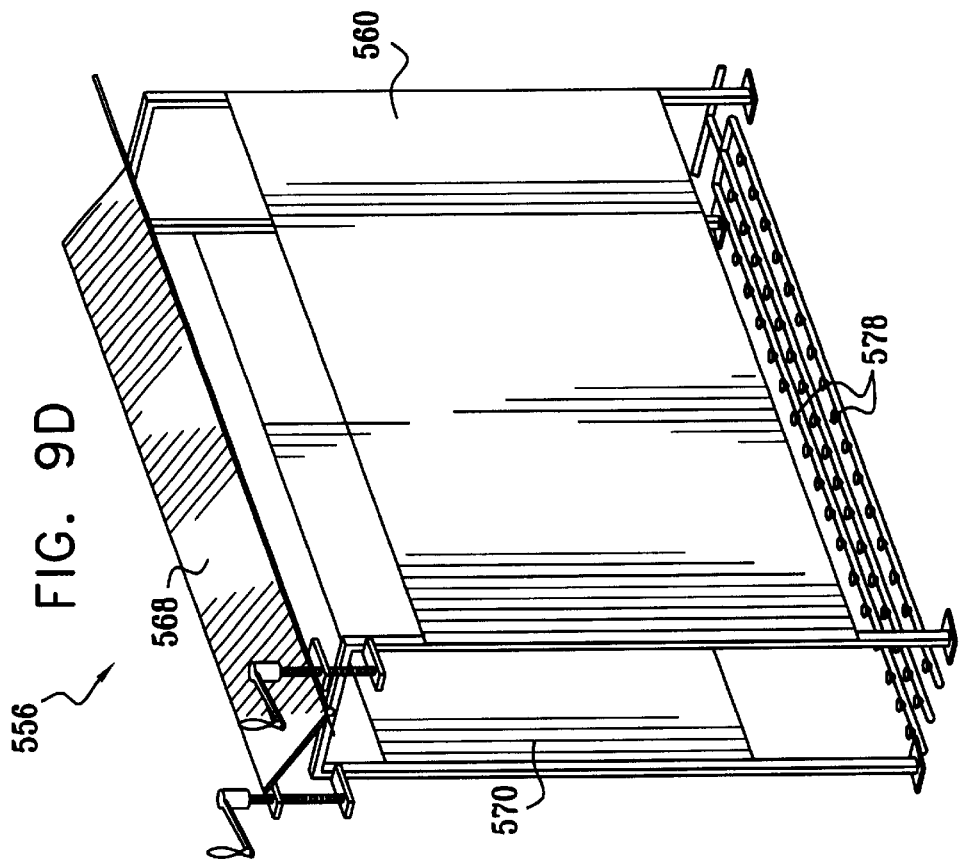
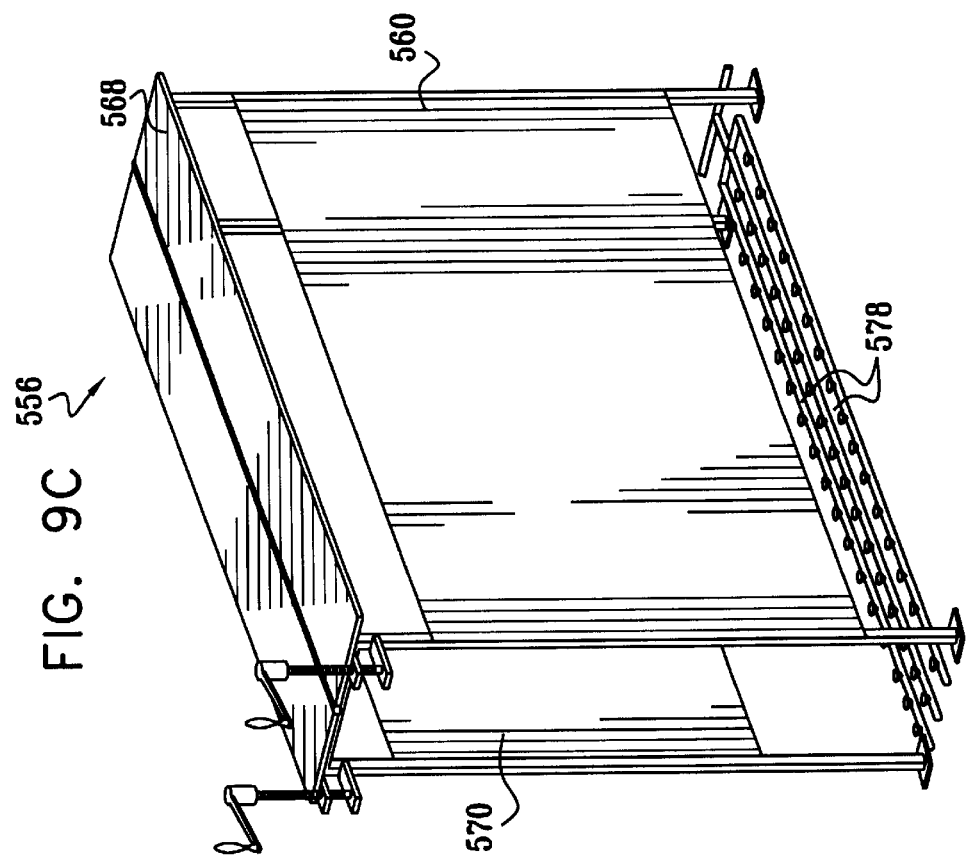

METHOD AND APPARATUS FOR BIOLOGICAL WASTEWATER TREATMENT

FIELD OF THE INVENTION

The present invention relates to water treatment generally and more particularly to systems and methodologies for biological water treatment.

BACKGROUND OF THE INVENTION

The following patents and publications are believed to represent the current state of the art:

U.S. Pat. Nos. 3,133,017; 4,045,344; 4,137,171; 4,231,863; 4,256,573; 4,374,730; 4,394,268; 4,521,311; 4,454,038; 4,521,311; 4,566,971; 4,599,174; 4,810,377; 4,820,415; 4,839,053; 5,030,353; 5,200,081; 5,202,027; 5,554,289; 5,698,094; 6,036,863.

French Patent FR 2,707,183.

A NEW PROCESS FOR ENRICHING NITRIFIERS IN ACTIVATED SLUDGE THROUGH SEPARATE HETEROTROPHIC WASTING FROM BIOFILM CARRIERS by Denny S. Parker, Bjorn Rusten, Asgeir Wien and Jon G. Siljudalen, Brown and Caldwell, P.O. Box 8045 Walnut Creek, Calif. 94596-1220, WEFTEC 2000, Copyright 2000 Water Environment Federation;

PILOT STUDY TO FULL SCALE TREATMENT-THE MOVING BED BIOFILM REACTOR EXPERIENCE AT THE PHILLIPS 66 BORGER REFINERY by Chandler H. Johnson and Michael W. Page, WEFTEC 2000, Copyright 2000 Water Environment Federation;

UPGRADING TO NITROGEN REMOVAL WITH THE KMT MOVING BED BIOFILM PROCESS by Bjorn Rusten, Jon G. Siljudalen and Bjornar Nordeidet, Wat. Sci. Tech. Vol 29, No. 12, pp 185–195, 1994;

THE TWO STAGE MOVING BED/ACTIVATED SLUDGE PROCESS, AN EFFECTIVE SOLUTION FOR HIGH STRENGTH WASTES by Narinder Sunner, Chris Evans, Graig Siviter and Tom Bower, Water and Environmental Management, Volume 13, Number 5, October, 1999;

UPGRADING WASTEWATER TREATMENT PLANTS BY THE USE OF BIOFILM CARRIERS, OXYGEN ADDITION AND PRE-TREATMENT IN THE SEWER NETWORK by Anette Aesoy, Hallvard Odegaard, Marius Haegh, Frode Risla and Greta Bentzen, Water Science & Technology, Vol 37, Number 9, 1998.

APPLICATION OF INVERSE FLUIDIZATION IN WASTEWATER TREATMENT: FROM LABORATORY TO FULL-SCALE BIOREACTORS, by D. G. Karamanev and L. N. Nikolov, Environmental Progress, Vol. 15, No. 3, pp 194–196, Fall 1996.

SUMMARY OF THE INVENTION

The present invention seeks to provide improved systems and methodologies for biological water treatment.

There is thus provided in accordance with a preferred embodiment of the present invention a method for retrofitting existing waste water treatment facilities having at least one existing basin. The method includes installing generally vertical partitions at spaced locations in at least one existing basin in order to divide the existing basin into a plurality of treatment stage regions, installing at least one air lift in each of the plurality of treatment stage regions, loading each treatment stage regions with a quantity of floatable porous particles, supplying waste water to at least one of the plurality of treatment stage regions and allowing the waste water, but generally not the particles, to flow from at least one of the plurality of treatment stage regions to at least another of the plurality of treatment stage regions and operating the air lift in each of the plurality of treatment stage regions to provide aerobic waste water flow therein in operative engagement with the floatable porous particles.

There is also provided in accordance with a preferred embodiment of the present invention a method for waste water treatment employing at least one basin. The method includes installing generally vertical partitions at spaced locations in at least one basin in order to divide the basin into a plurality of treatment stage regions, installing at least one air lift in each of the plurality of treatment stage regions, loading each treatment stage regions with a quantity of floatable porous particles, supplying waste water to at least one of the plurality of treatment stage regions and allowing the waste water, but generally not the particles, to flow from at least one of the plurality of treatment stage regions to at least another of the plurality of treatment stage regions and operating the air lift in each of the plurality of treatment stage regions to provide aerobic waste water flow therein in operative engagement with the floatable porous particles.

There is further provided in accordance with another preferred embodiment of the present invention a retrofitted waste water treatment apparatus. The apparatus includes at least one existing basin, generally vertical partitions located at spaced locations in the existing basin in order to divide the existing basin into a plurality of treatment stage regions, at least one air lift located in each of the plurality of treatment stage regions and a quantity of floatable porous particles loaded into each of the plurality of treatment stage regions, whereby supplying waste water to at least one of the plurality of treatment stage regions and allowing the waste water, but generally not the particles, to flow from at least one of the plurality of treatment stage regions to at least another of the plurality of treatment stage regions and operating the air lift in each of the plurality of treatment stage regions provides aerobic waste water flow therein in operative engagement with the floatable porous particles.

There is further provided in accordance with yet another preferred embodiment of the present invention a waste water treatment apparatus. The apparatus includes at least one basin, generally vertical partitions located at spaced locations in the basin in order to divide the basin into a plurality of treatment stage regions, at least one air lift located in each of the plurality of treatment stage regions and a quantity of floatable porous particles loaded into each of the plurality of treatment stage regions, whereby supplying waste water to at least one of the plurality of treatment stage regions and allowing the waste water, but generally not the particles, to flow from at least one of the plurality of treatment stage regions to at least another of the plurality of treatment stage regions and operating the air lift in each of the plurality of treatment stage regions provides aerobic waste water flow therein in operative engagement with the floatable porous particles.

Further in accordance with a preferred embodiment of the present invention at least some of the vertical partitions are spaced from a bottom of the basin in order to allow the waste water to flow thereunder between adjacent ones of the plurality of treatment stage regions.

Still further in accordance with a preferred embodiment of the present invention the air lift includes the air diffuser disposed underlying a peripheral enclosure which defines a column of water and is lifted by air diffusing upwardly from the air diffuser therethrough.

Additionally in accordance with a preferred embodiment of the present invention the peripheral enclosure includes a cylindrical enclosure. Alternatively, the peripheral enclosure includes a plurality of spaced generally vertical walls which extend between walls of the basin and are separated from the bottom of the basin.

Further in accordance with a preferred embodiment of the present invention the floatable particles include porous plastic particles having a density lower than that of pure water. Preferably, the particles have a specific gravity between 0.65 and 0.95 and have an irregular shape, whose largest dimension is generally between 4–10 mm.

Additionally in accordance with a preferred embodiment of the present invention, the particles have a total porosity exceeding 50% and have a mean pore diameter of pores, whose diameter exceeds 10 microns, of about 20 microns.

Further in accordance with a preferred embodiment of the present invention the generally vertical partitions divide the basin into between 4 and 12 process stages.

Still further in accordance with a preferred embodiment of the present invention the air lift includes a series of air lifts arranged in the multiple process stages. Preferably, the series of air lifts includes at each process stage an initial air lift assembly and at least one intermediate air lift assembly. The initial air lift assembly typically includes a upstream partition which extends downwardly from a top location above a water level in the basin to a bottom location spaced from the bottom of the basin.

Further in accordance with a preferred embodiment of the present invention the upstream partition extends fully from side to side of the basin.

Additionally or alternatively the upstream partition is attached to a deflector which extends in a downstream direction from the upstream partition at the water level.

Still further in accordance with a preferred embodiment of the present invention the initial air lift assembly also includes a downstream partition which extends fully from side to side of the basin but does not extend up to the water level.

Moreover in accordance with a preferred embodiment of the present invention the intermediate air lift assembly includes an upstream partition which extends downwardly from a top location below the water level in basin to a bottom location spaced from the bottom of the basin.

Further in accordance with a preferred embodiment of the present invention the vertical partitions each extend fully from side to side of the basin.

Additionally in accordance with a preferred embodiment of the present invention the intermediate air lift assembly includes an upstream partition separated from a deflector plate which extends in a downstream direction from the upstream partition at the water level. Preferably, the intermediate air lift assembly also includes a downstream partition which does not extend up to the water level or as close to the bottom of the basin as does the upstream partition.

Still further in accordance with a preferred embodiment of the present invention the step of installing also includes installing a final air lift assembly including an upstream partition which extends downwardly from a top location below the water level in the basin to a bottom location spaced from the bottom of the basin and extends fully from side to side of the basin. Preferably, the final air lift assembly also includes a downstream partition which also extends fully from side to side of the basin and extends to a top location above the water level and closer to the bottom than does the upstream partition. Additionally or alternatively, the downstream partition is attached to a deflector plate which extends in an upstream direction from downstream partition at a location at the water level.

Further in accordance with a preferred embodiment of the present invention the air lift includes a plurality of air lift assemblies each including upstream and downstream partitions: a first plurality of air diffusers are disposed at the bottom of the basin intermediate upstream and downstream partitions of the plurality of air lift assemblies and a second plurality of air diffusers, lesser in number than the first plurality of air diffusers, are disposed at the bottom of the basin intermediate the plurality of air lift assemblies.

Preferably, the first plurality of air diffusers intermediate the upstream and downstream partitions of each air lift assembly causes water to flow upward between the upstream and downstream partitions of each air lift assembly. Additionally, the second plurality of air diffusers intermediate the plurality of air lift assemblies allows water to flow downward.

Still further in accordance with a preferred embodiment of the present invention the step of loading includes loading 10–40 percent of the volume of the basin with particles in absence of water flow.

Additionally in accordance with a preferred embodiment of the present invention the step of supplying includes providing a continuous flow of water from the upstream side of the basin from the waste water inlet to the treated water outlet. Typically, the flow is an undulating flow and includes passage under upstream partitions which is of relatively low volume and generally does not carry floating particles into the air lift, thereby constraining the particles to reside outside of and between the air lift.

Further in accordance with a preferred embodiment of the present invention, the method also includes controlling the flow velocity of water by controlling operation of the first and second pluralities of air diffusers.

Further in accordance with a preferred embodiment of the present invention the air lift includes an adjustable angle deflector.

Still further in accordance with a preferred embodiment of the present invention the air lift includes an integral curved downstream partition and deflector.

Further in accordance with a preferred embodiment of the present invention the method also includes installing a denitrification unit in at least one of the plurality of treatment stage regions. Preferably, the denitrification unit includes a plurality of axial pumps which provide lift generally without an air flow, thereby to provide an anoxic de-nitrification process.

Further in accordance with a preferred embodiment of the present invention the air lift includes an array of air lifts and wherein the array of air lifts includes a multiplicity of cylindrical air lifts arranged in the plurality of treatment stage regions and separated by the vertical partitions which extend from a bottom location and is spaced from a bottom of the basin by a first vertical separation.

Preferably, the cylindrical air lifts each include: a hollow shaft which extends from a bottom location spaced from a bottom of the basin by a second vertical separation which exceeds the first separation, a deflector which is disposed in spaced relationship over each hollow shaft and is disposed at the water level and at least one air diffuser which is disposed underlying each hollow shaft to provide an air lift therethrough, thereby causing water to flow into the hollow shafts and upwardly through the hollow shafts, the deflectors causing the water exiting the tops of the hollow shafts to move sideways and downwardly.

Additionally in accordance with a preferred embodiment of the present invention the cylindrical air lifts also includes a plurality of air diffusers disposed immediately upstream of each the vertical partition for providing control of particle movement and prevention of particle migration.

Further in accordance with a preferred embodiment of the present invention the step of operating produces fluidization of the particles. Preferably, the operating step is operative, when the particles become heavily coated with biomass to cause the particles sometimes to enter the air lift and to be sloughed of some of the biomass as they are propelled upwards by the action of the air lift.

BRIEF DESCRIPTION OF THE DRAWINGS

The present invention will be understood and appreciated more fully from the following detailed description, taken in conjunction with the drawings in which:

FIGS. 8A, 8B, 8C & 8D are simplified illustrations of four embodiments of a unidirectional rectangular airlift used in the embodiment of FIGS. 2–7;

FIGS. 9A, 9B, 9C & 9D are simplified illustrations of four embodiments of a bidirectional rectangular airlift used in the embodiment of FIGS. 2–7;

DETAILED DESCRIPTION OF PREFERRED EMBODIMENTS

Figure 1A:
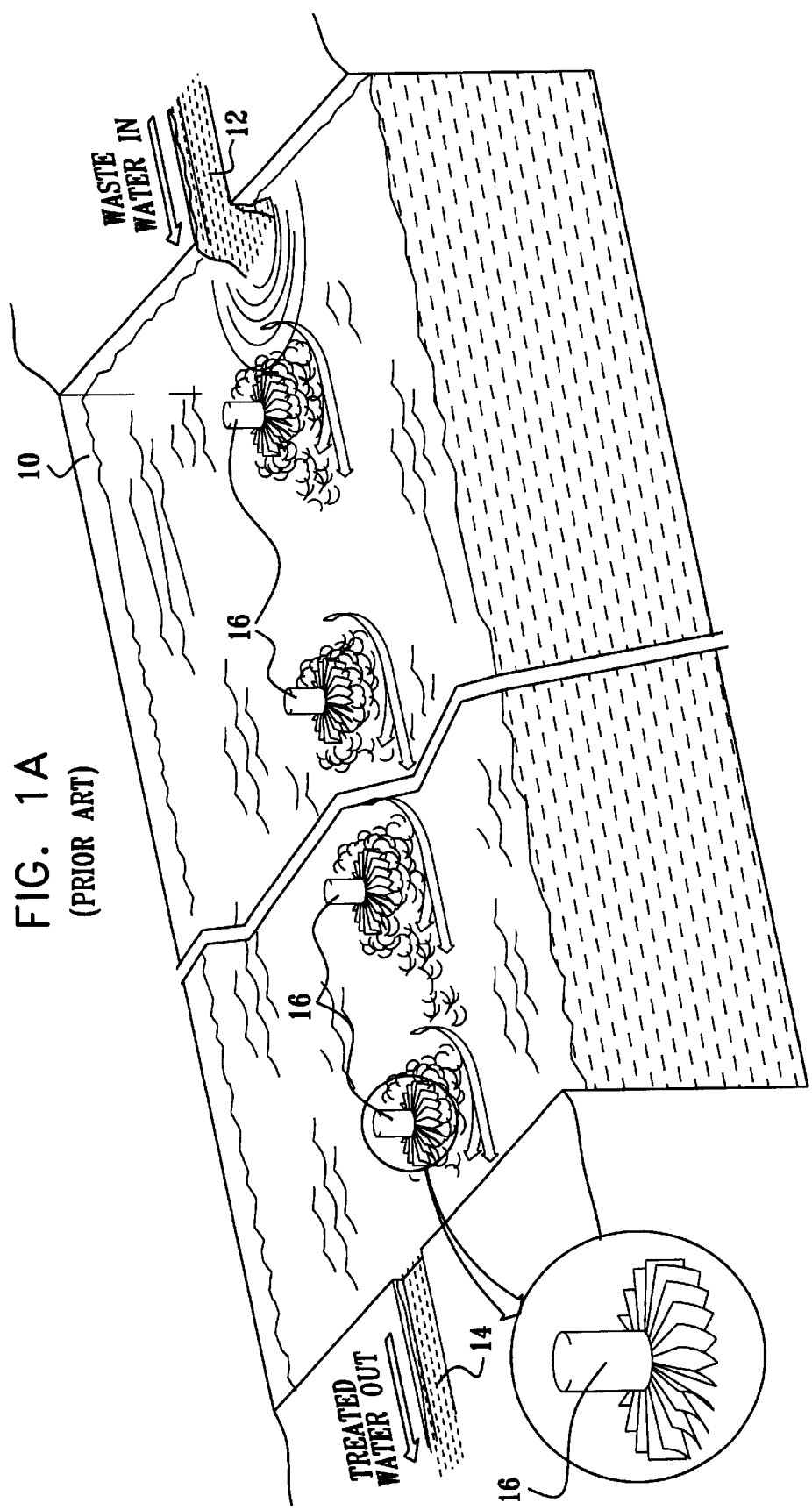
FIGS. 1A and 1B are simplified illustrations of two types of prior art waste water treatment systems, which respectively employ surface aerators and diffused air aeration.
Figure 1B:
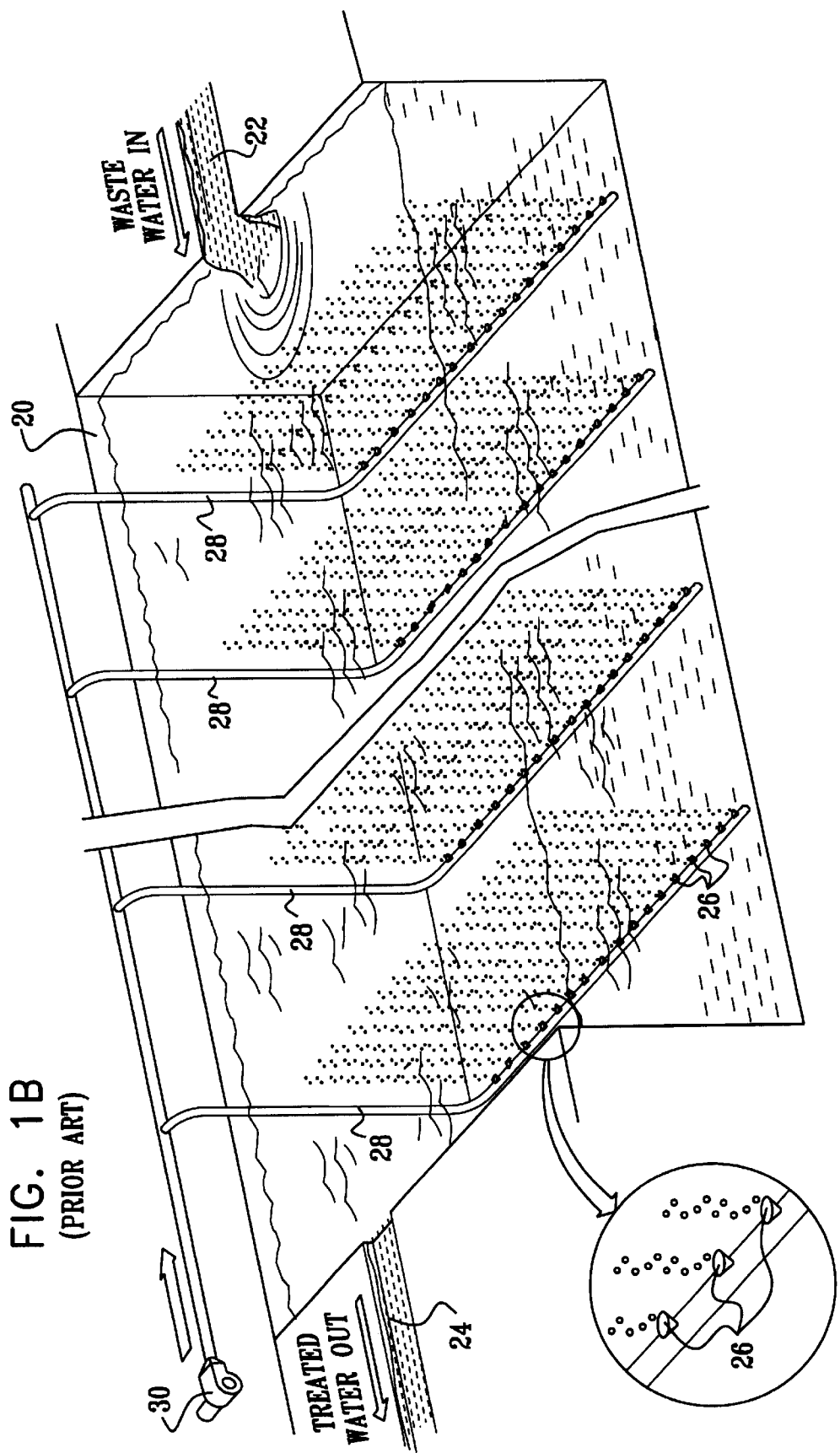

Reference is now made to FIGS. 1A and 1B, which are simplified illustrations of two types of prior art waste water treatment systems, which respectively employ surface aerators and diffused air aeration.

As seen in FIG. 1A, one conventional type of prior art waste water treatment system comprises a basin 10 having a waste water inlet 12 and a treated water outlet 14. A plurality of surface aerators 16 are disposed at the water level of water in basin 10 and are operative to aerate the water therein, thus promoting biological activity and biological decomposition of organic material therein.

Another conventional type of prior art waste water treatment system is shown in FIG. 1B and comprises a basin 20 which may be identical to basin 10 (FIG. 1), having a waste water inlet 22 and a treated water outlet 24. A plurality of air diffusers 26 are disposed at the bottom of basin 20 and are coupled by air conduits 28 to an air blower 30. Operation of blower 30 causes air to bubble upwardly through waste water in basin 20, thus promoting biological activity and biological decomposition of organic material therein.

Figure 2:
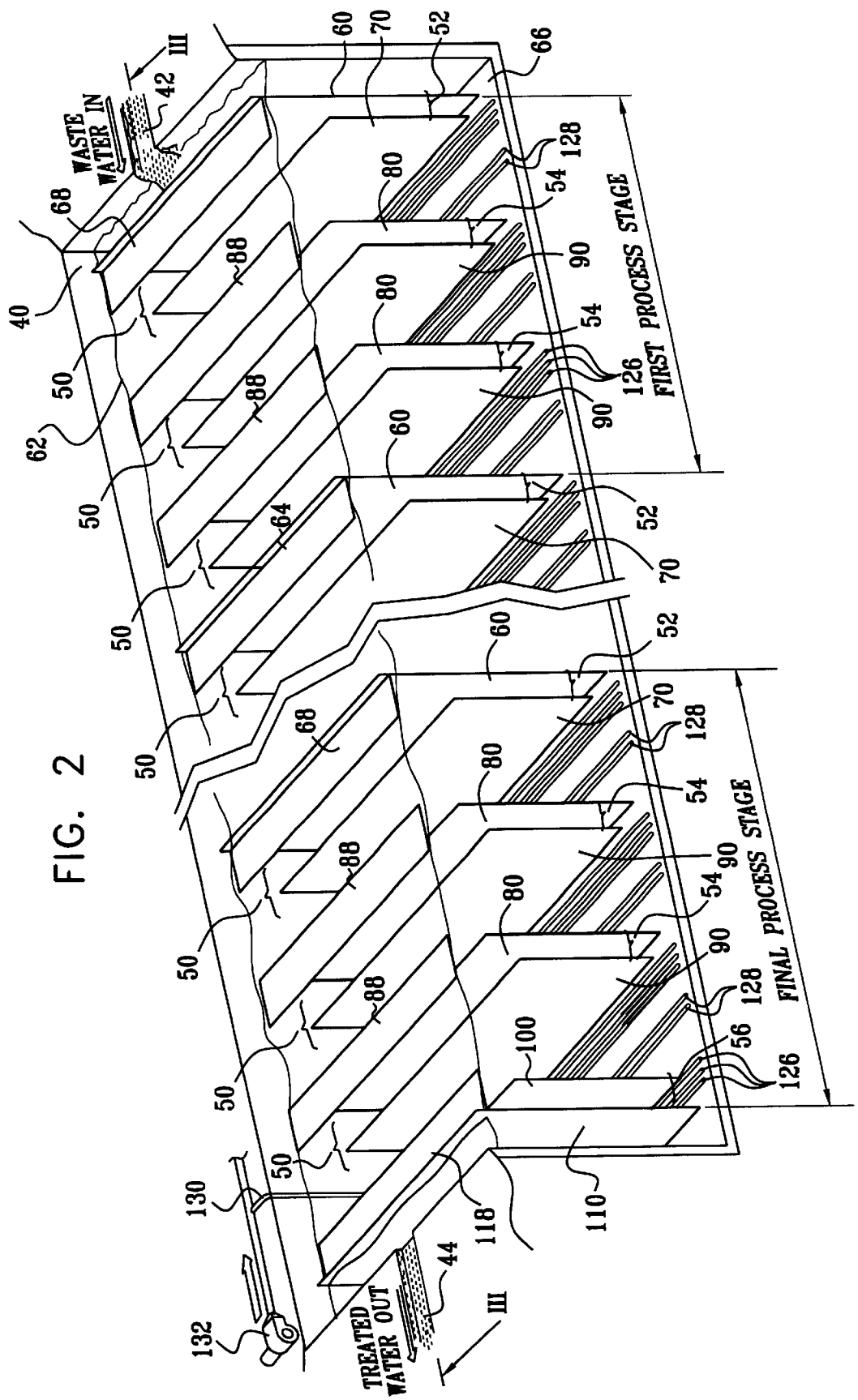
FIG. 2 is a simplified illustration of a retrofit of a waste water treatment system of the type of FIG. 1A or FIG. 1B in accordance with a preferred embodiment of the present invention.
Figure 3:
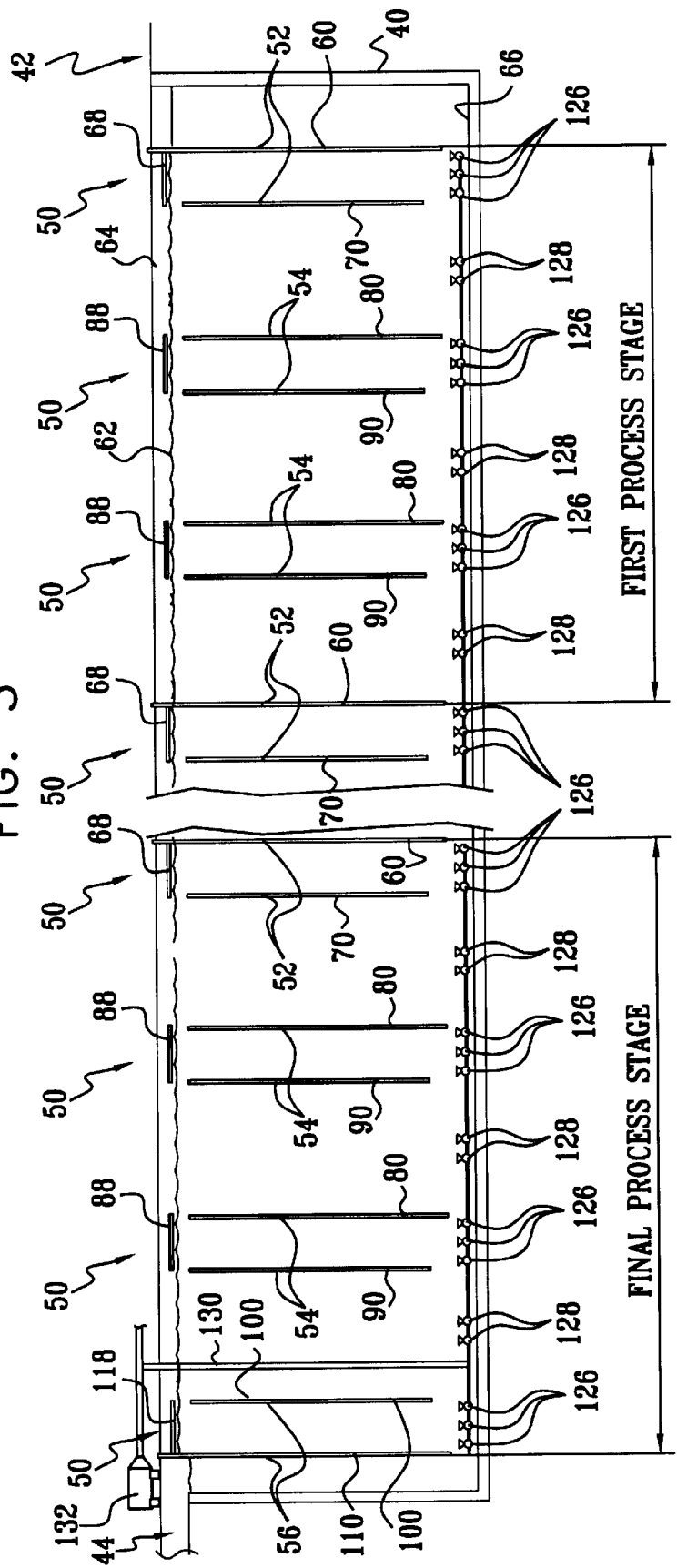
FIG. 3 is a sectional illustration taken along lines III—III in FIG. 2.

Reference is now made to FIGS. 2 & 3, which are simplified illustrations of a retrofit to a waste water treatment system of the type of FIG. 1A or FIG. 1B in accordance with a preferred embodiment of the present invention. As shown in FIGS. 2 and 3, it is a particular feature of the present invention that a series of air lifts are retrofitted into a conventional waste water treatment system including a basin 40 having a waste water inlet 42 and a treated water outlet 44.

In accordance with a preferred embodiment of the invention, a series of air lifts 50 is arranged in multiple process stages, typically 4–12 in number. Each process stage includes an initial air lift assembly, here designated by reference numeral 52 and at least one intermediate air lift assembly, here designated by reference numeral 54. A final process stage preferably includes a final air lift assembly, here designated by reference numeral 56.

Initial air lift assembly 52 preferably includes a upstream partition 60 which preferably extends downwardly from a top location above the water level 62 in basin 40 to a bottom location spaced from the bottom 66 of basin 40 and preferably extends fully from side to side of the basin 40. In the initial air lift assembly 52, the upstream partition is attached to a deflector plate 68 which extends in a downstream direction from upstream partition 60 at a location preferably generally at the water level 62. The initial air lift assembly 52 preferably also includes a downstream partition 70 which also extends fully from side to side of the basin 40 but does not extend up to the water level 62 or as close to the bottom 66 as does partition 60.

Each intermediate air lift assembly 54 preferably includes an upstream partition 80 which preferably extends downwardly from a top location below the water level 62 in basin 40 to a bottom location spaced from the bottom 66 of basin 40 and preferably extends fully from side to side of the basin 40. In the intermediate air lift assembly 54, the upstream partition 80 is separated from a deflector plate 88 which extends in a downstream direction from upstream partition 80 at a location preferably generally at the water level 62. The intermediate air lift assembly 54 preferably also includes a downstream partition 90 which also extends fully from side to side of the basin 40 but does not extend up to the water level 62 or as close to the bottom 66 as does partition 80. The top of downstream partition 90 is preferably at the same level as is the top of upstream partition 80.

Final air lift assembly 56 preferably includes an upstream partition 100 which preferably extends downwardly from a top location below the water level 62 in basin 40 to a bottom location spaced from the bottom 66 of basin 40 and preferably extends fully from side to side of the basin 40. The final air lift assembly 56 preferably also includes a downstream partition 110 which also extends fully from side to side of the basin 40 and extends to a top location above the water level 62 and closer to the bottom 66 than does partition 110. In the final air lift assembly 56, the downstream partition 110 is attached to a deflector plate 118 which extends in an upstream direction from downstream partition 110 at a location preferably generally at the water level 62.

It is noted that in the retrofit of FIGS. 2 & 3 a first plurality of air diffusers 126 are disposed at the bottom of basin 40 intermediate the upstream and downstream partitions of each air lift assembly and a second plurality of air diffusers 128, typically lesser in number than the first plurality of air diffusers are disposed at the bottom of basin 40 intermediate adjacent air lift assemblies. All of the air diffusers are coupled by air conduits 130 to one or more air blowers 132.

Figure 4:
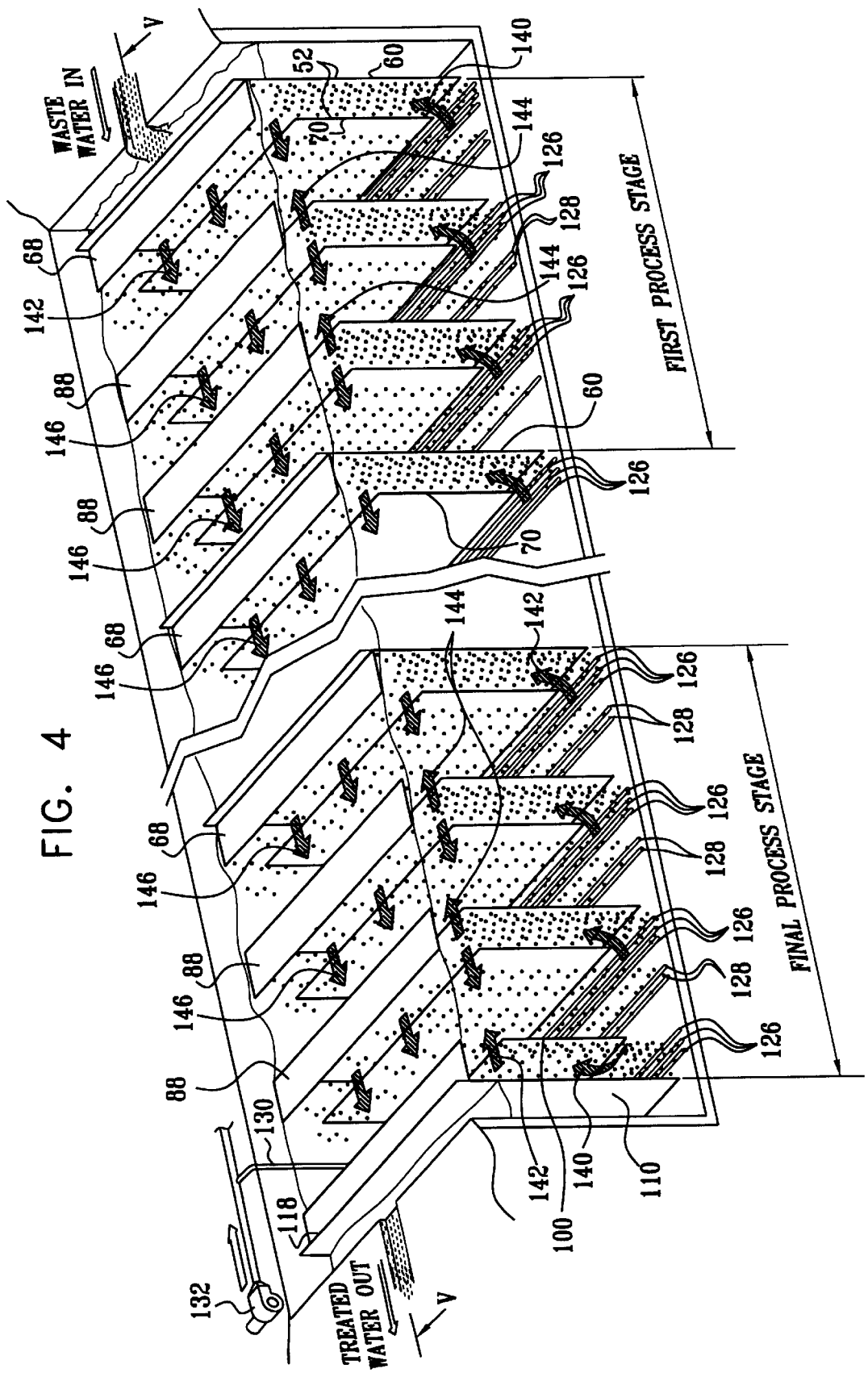
FIG. 4 is a simplified illustration of the retrofit of FIGS. 2 & 3 showing water flows.
Figure 5:
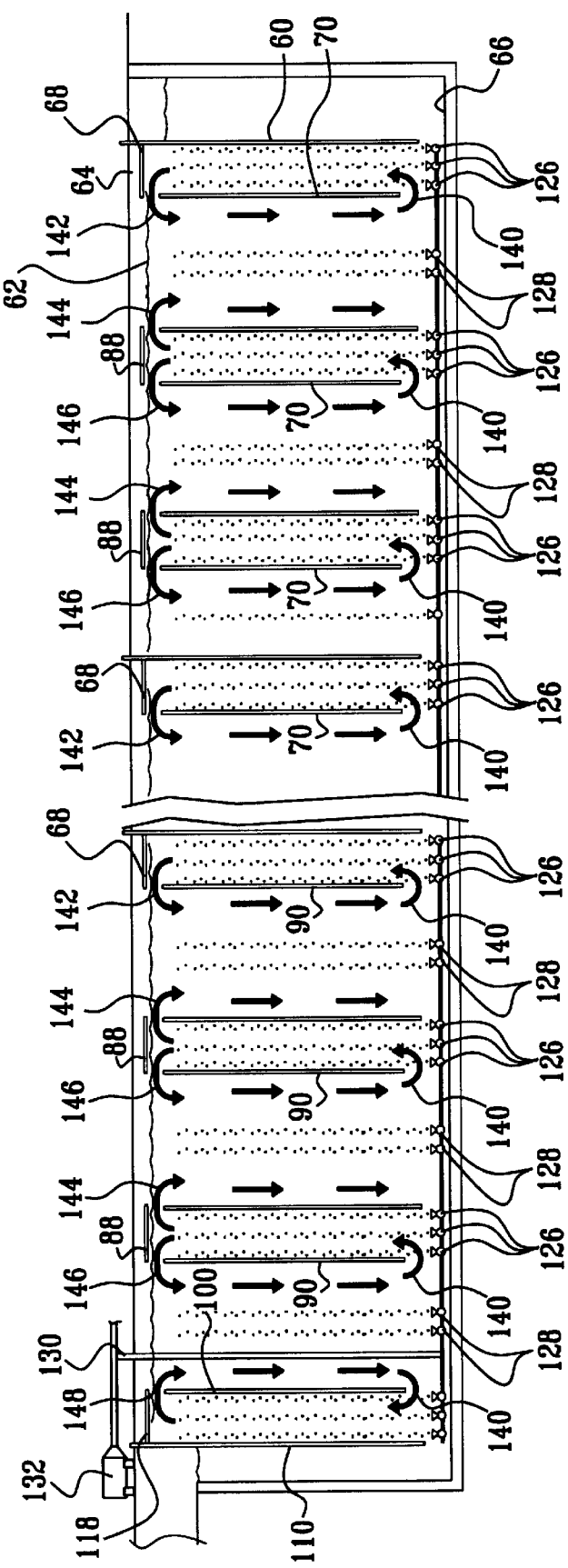
FIG. 5 is a sectional illustration taken along lines V—V in FIG. 4, showing water flows.

Reference is now made to FIGS. 4 and 5, which are simplified illustrations of the retrofit of FIGS. 2 and 3 showing water flows. As seen in FIGS. 4 and 5, the relatively high density of air diffusers intermediate the upstream and downstream partitions of each air lift assembly causes water to flow upward between the upstream and downstream partitions of each air lift assembly, as indicated by arrows 140. The relatively lower density of air diffusers intermediate adjacent air lift assemblies allows water to flow downward.

Due to the construction of the initial airlift assemblies 52, water flows only in a downstream direction at the top of each initial airlift assembly 52, as indicated by arrows 142. Due to the different construction of the intermediate airlift assemblies 54, water flows in both upstream and downstream directions, indicated by respective arrows 144 and 146, at the top of each intermediate airlift assembly 54. Due to the construction of the final airlift assembly 56, water flows only in an upstream direction, indicated by arrows 148, at the top the final airlift assembly 56.

Figure 6:
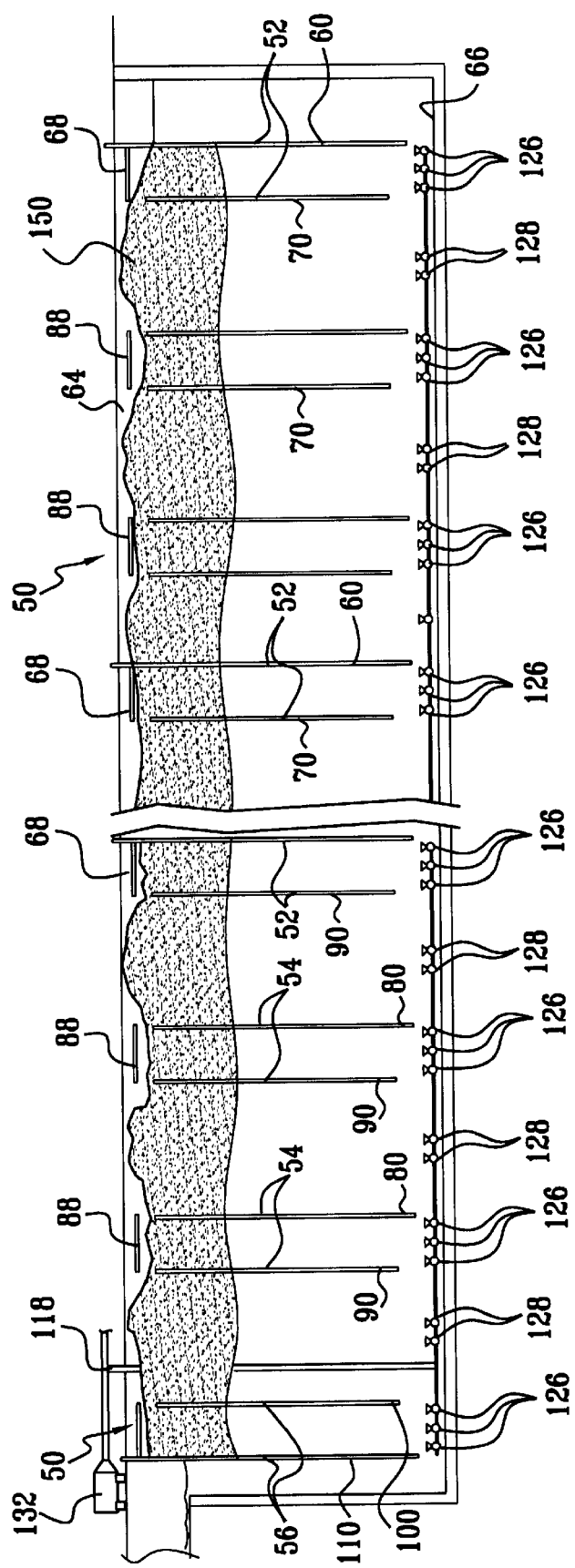
FIG. 6 is a sectional illustration corresponding to FIG. 3 and showing particles located in the retrofit of FIG. 2 in the absence of fluid flow.

Reference is now made to FIG. 6, which is a sectional illustration corresponding to FIG. 3 and showing particles 150 preferably located in the retrofit of FIG. 2 in the absence of fluid flow. Particles 150 are preferably floating porous plastic particles having a density lower than that of pure water, preferably having a specific gravity between 0.65 and 0.95. Typically, the particles have an irregular shape, whose largest dimension is approximately 4–10 mm and preferably about 6 mm. Preferably the particles have a total porosity exceeding 50% and a preferred mean pore diameter of pores, whose diameter exceeds 10 microns, of about 20 microns.

As seen in FIG. 6, preferably 10–40 percent of the volume of the basin is filled with particles 150 in the absence of water flow.

Figure 7:
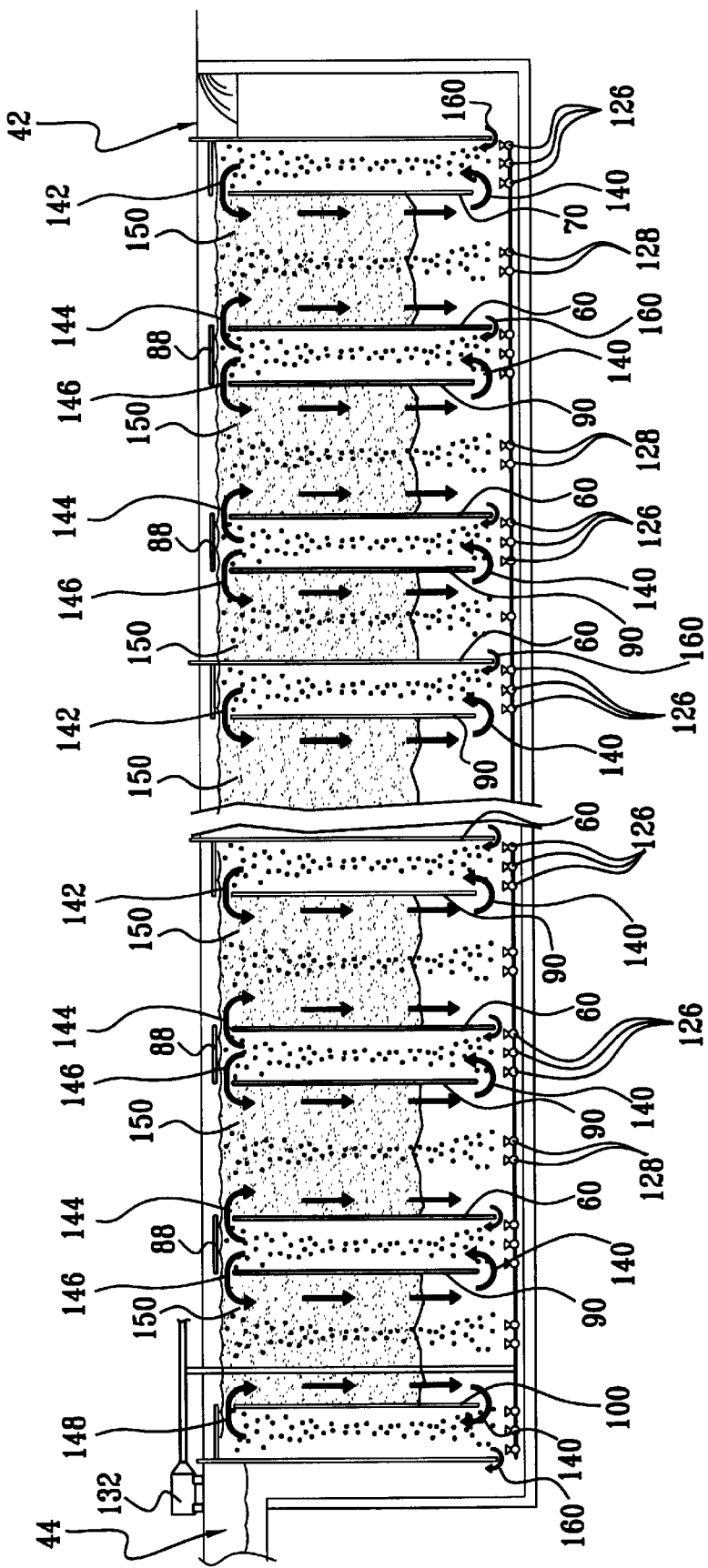
FIG. 7 is a sectional illustration corresponding to FIG. 6 and showing water flows and fluidization of particles thereby.

Reference is now made to FIG. 7, which is a sectional illustration corresponding to FIG. 6 and showing water flows and fluidization of particles thereby. It is seen in FIG. 7, that due to the water flows, typified in FIGS. 4 and 5, the volume of the bed of particles 150 increases substantially, as the bed of particles is fluidized. The particles 150 are generally constrained to reside outside of the air lift assemblies, inasmuch as they generally do not pass underneath upstream partitions 60. When particles 150 become heavily coated with biomass, they do sometimes pass under downstream partitions 70 or 90 or upstream partition 100 and are sloughed of some of the biomass as they are propelled upwards by the action of the air lift.

It is noted that in addition to the water flows indicated by arrows 142, 144, 146 and 148, there exists a continuous flow of water from the upstream side of the basin 40 from the waste water inlet 42 to the treated water outlet 44. This flow is an undulating flow and includes passage under upstream partitions 60, 80 and 100, as indicated by arrows 160. The passage under upstream partitions 60, 80 and 100 is of relatively low volume and generally does not carry floating particles 150 into the air lifts, thereby constraining the particles 150 to reside outside of and between the air lift assemblies and preventing migration of particles across air lift assemblies.

It is appreciated that the provision of first and second pluralities of air diffusers 126 and 128 enables control of flow velocity between adjacent air lifts while providing a high level of aeration to the water in basin 40.

Reference is now made to FIGS. 8A, 8B, 8C & 8D, which are simplified illustrations of four embodiments of a unidirectional rectangular airlift used in the embodiment of FIGS. 2–7.

FIG. 8A illustrates a preferred initial air lift assembly 52, including upstream partition 60, deflector 68 and downstream partition 70 as well as first plurality of air diffusers 128.

FIG. 8B illustrates a preferred final air lift assembly 56 including upstream partition 100, downstream partition 110 and deflector 118, as well as first plurality of air diffusers 128.

Figure 8D:
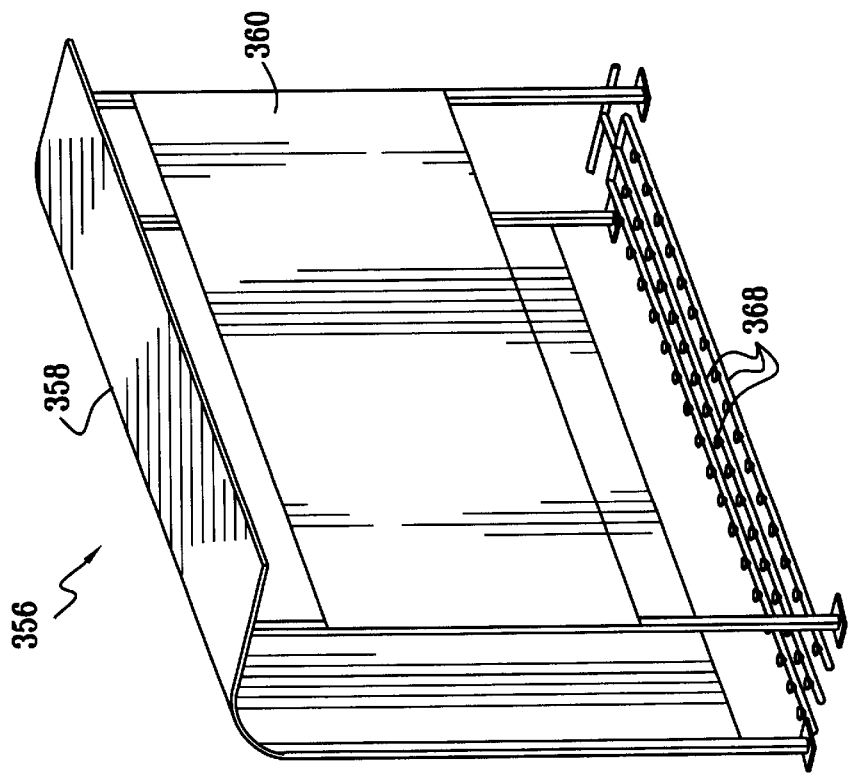
Figure 8C:
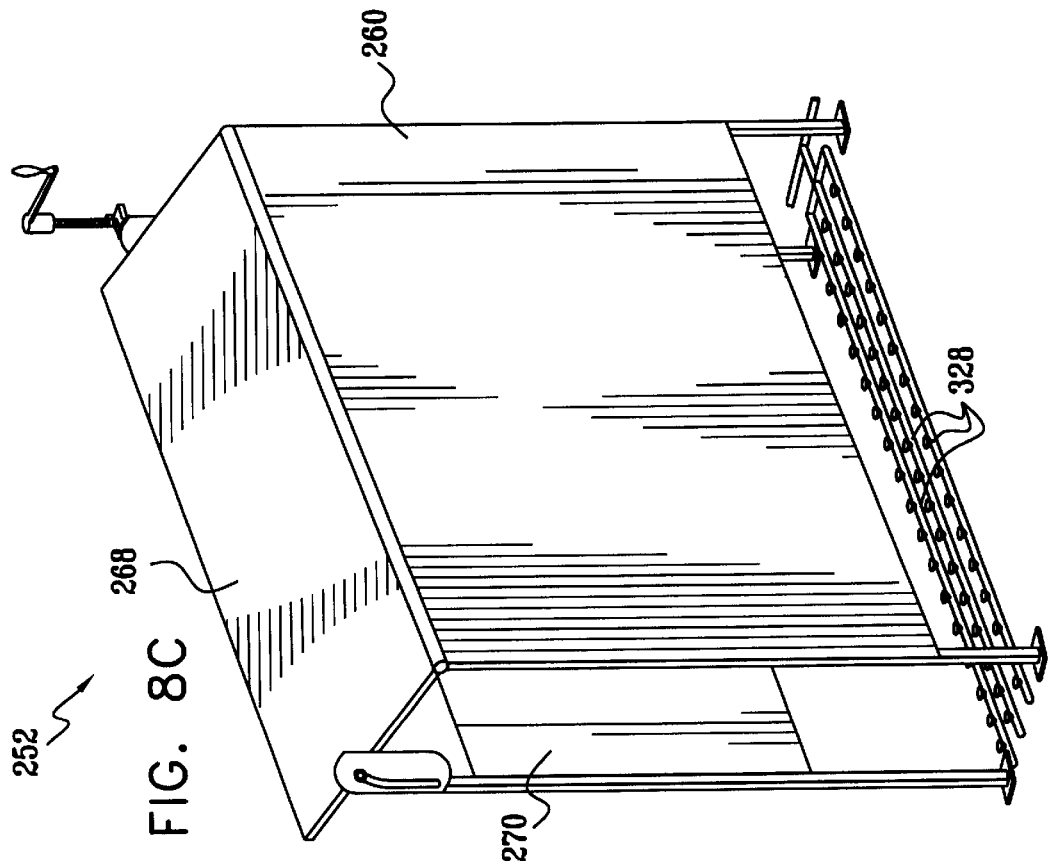

FIG. 8C illustrates an alternative initial air lift assembly 252, including upstream partition 260, an adjustable angle deflector 268 and a downstream partition 270 as well as first plurality of air diffusers 328.

FIG. 8D illustrates an alternative final air lift assembly 356 including an integral curved downstream partition and deflector 358 and an upstream portion 360, as well as a first plurality of air diffusers 368. The curved design of the integral downstream partition and deflector reduces energy losses.

It is appreciated that the adjustable configuration of FIG. 8C may be employed additionally or alternatively for a final air lift assembly and the integral configuration of FIG. 8D may be employed additionally or alternatively for an initial air lift assembly.

Reference is now made to FIGS. 9A, 9B, 9C & 9D, which are simplified illustrations of four embodiments of a bidirectional rectangular airlift used in the embodiment of FIGS. 2–7;

FIG. 9A illustrates a preferred intermediate air lift assembly 54, including upstream partition 80, deflector 88 and downstream partition 90 as well as first plurality of air diffusers 128.

FIG. 9B illustrates an alternative intermediate air lift assembly 456 including upstream partition 480, fixed angle deflector 482 and downstream portion 490, as well as a first plurality of air diffusers 498.

FIG. 9C illustrates a further alternative intermediate air lift assembly 556, including upstream partition 560, a two-way adjustable angle deflector 568 and a downstream partition 570 as well as first plurality of air diffusers 578. FIG. 9C shows the two-way adjustable angle deflector 568 in a flat orientation.

FIG. 9D illustrates the intermediate air lift assembly 556 of FIG. 9C in an alternative operative orientation wherein two-way adjustable angle deflector 568 is arranged to have an angled orientation, such as that shown in FIG. 9B.

Figure 10:
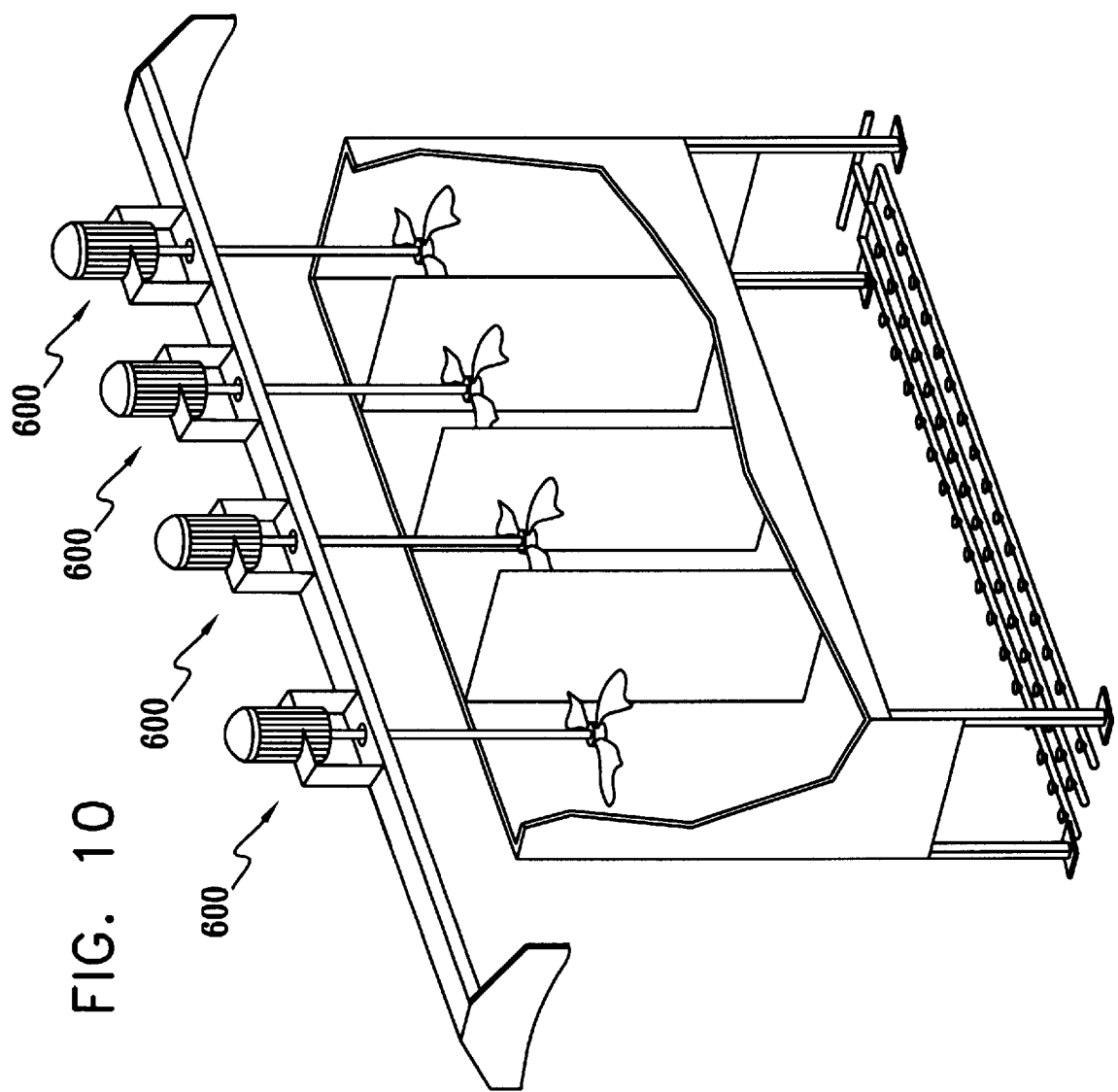
FIG. 10 is a simplified illustration of a denitrification unit useful in the embodiment of FIGS. 2–7.

Reference is now made to FIG. 10, which is a simplified illustration of a denitrification unit useful in the embodiment of FIGS. 2–7. De-nitrification units such as those shown in FIG. 10 may be installed instead of all of the intermediate air lifts 54 in a given process stage.

As seen in FIG. 10, a plurality of axial pumps 600 may provide lift without an air flow, as in the air lifts of FIGS. 1–9, thereby to provide an anoxic denitrification process.

Figure 11:
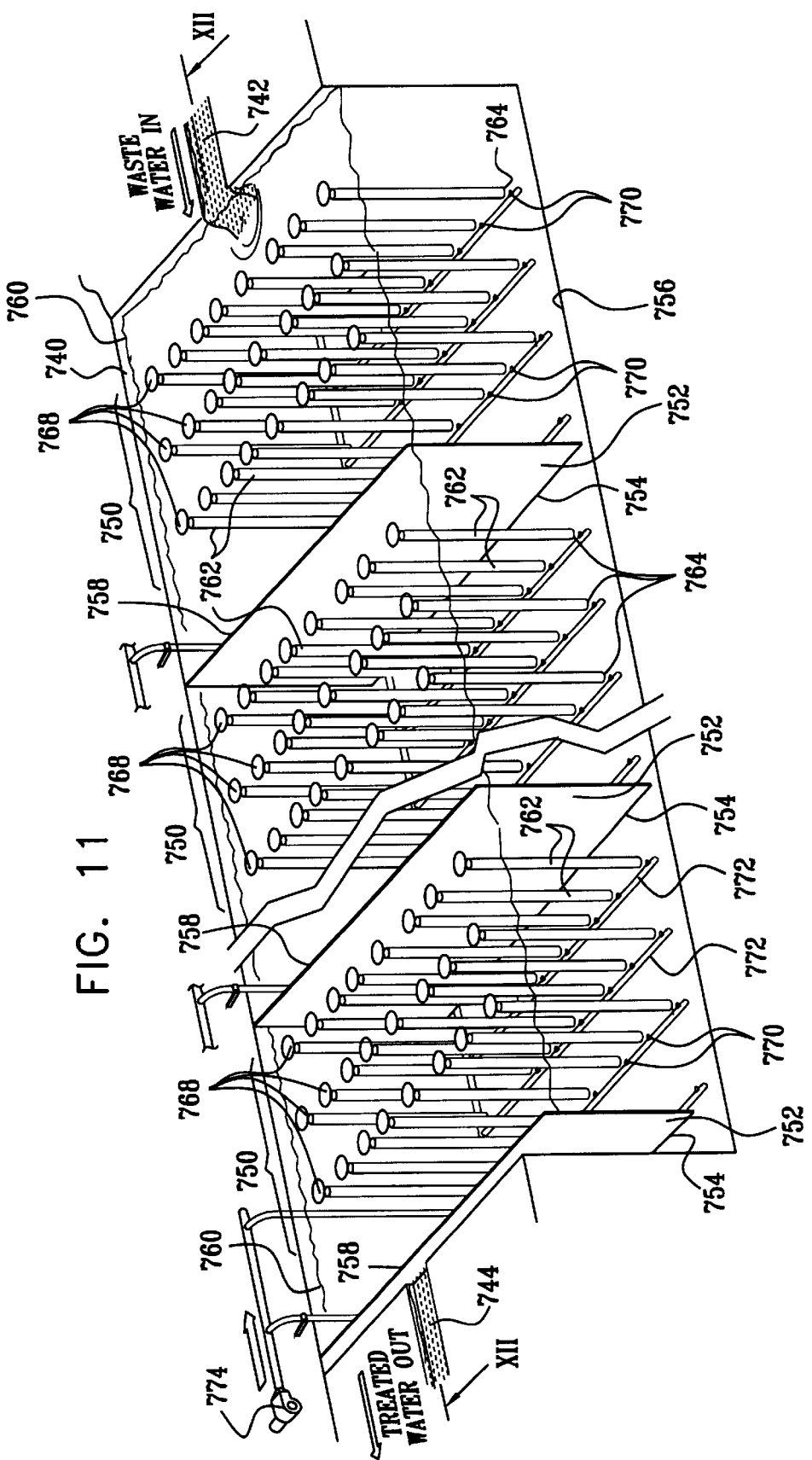
FIG. 11 is a simplified illustration of a retrofit of a waste water treatment system of the type of FIG. 1A or FIG. 1B in accordance with another embodiment of the present invention.
Figure 12:
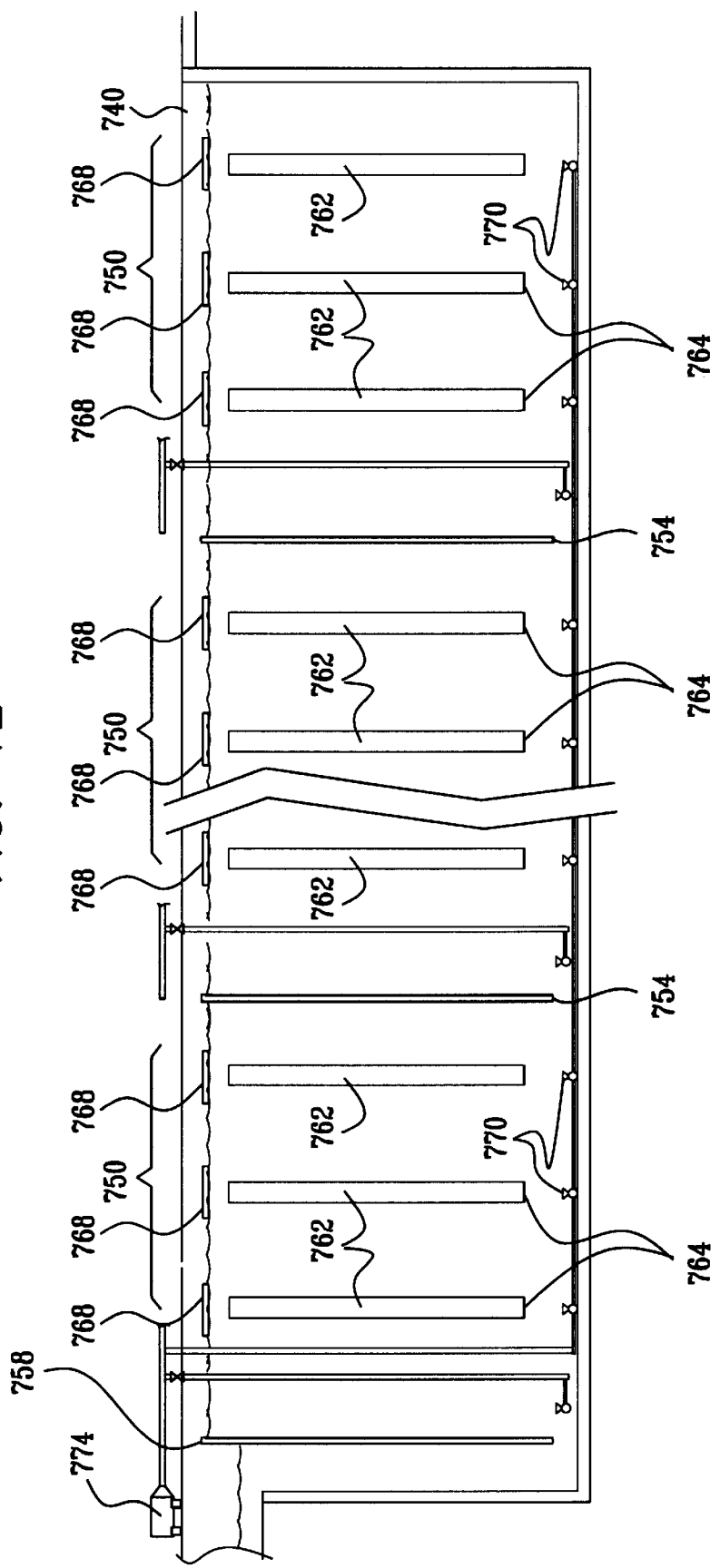
FIG. 12 is a sectional illustration taken along lines XII—XII in FIG. 11.

Reference is now made to FIGS. 11 and 12, which are simplified illustrations of a retrofit of a waste water treatment system of the type of FIG. 1A or FIG. 1B in accordance with another embodiment of the present invention.

As shown in FIGS. 11 and 12, it is a particular feature of the present invention that an array of air lifts are retrofitted into a conventional waste water treatment system including a basin 740 having a waste water inlet 742 and a treated water outlet 744.

In accordance with a preferred embodiment of the invention, an array of cylindrical air lifts 750 is arranged in multiple process stages, typically 4–12 in number, which are separated from each other typically by partitions 752, which extend from a bottom location 754 spaced from the bottom 756 of basin 740 by a first vertical separation and extend upwardly to a top location 758 above the water level 760 in basin 740. Partitions 752 preferably extend fully from side to side of the basin 740. Each cylindrical air lift 750 typically comprises a hollow shaft 762 which extends from a bottom location 764 spaced from bottom 756 by a second vertical separation which exceeds the first separation.

A deflector 768 is preferably disposed in spaced relationship over each hollow shaft 762 and is disposed at a location preferably at the water level 760.

It is noted that in the retrofit of FIGS. 11 & 12 an air diffuser 770 is preferably disposed underlying each hollow shaft 762 to provide an air lift therethrough. All of the air diffusers 770 are coupled by air conduits 772 to one or more air blowers 774.

Immediately upstream of each partition 752 there is provided a series of air diffusers 776, which are preferably coupled by air conduits 778 to one or more air blowers 774.

Figure 13:
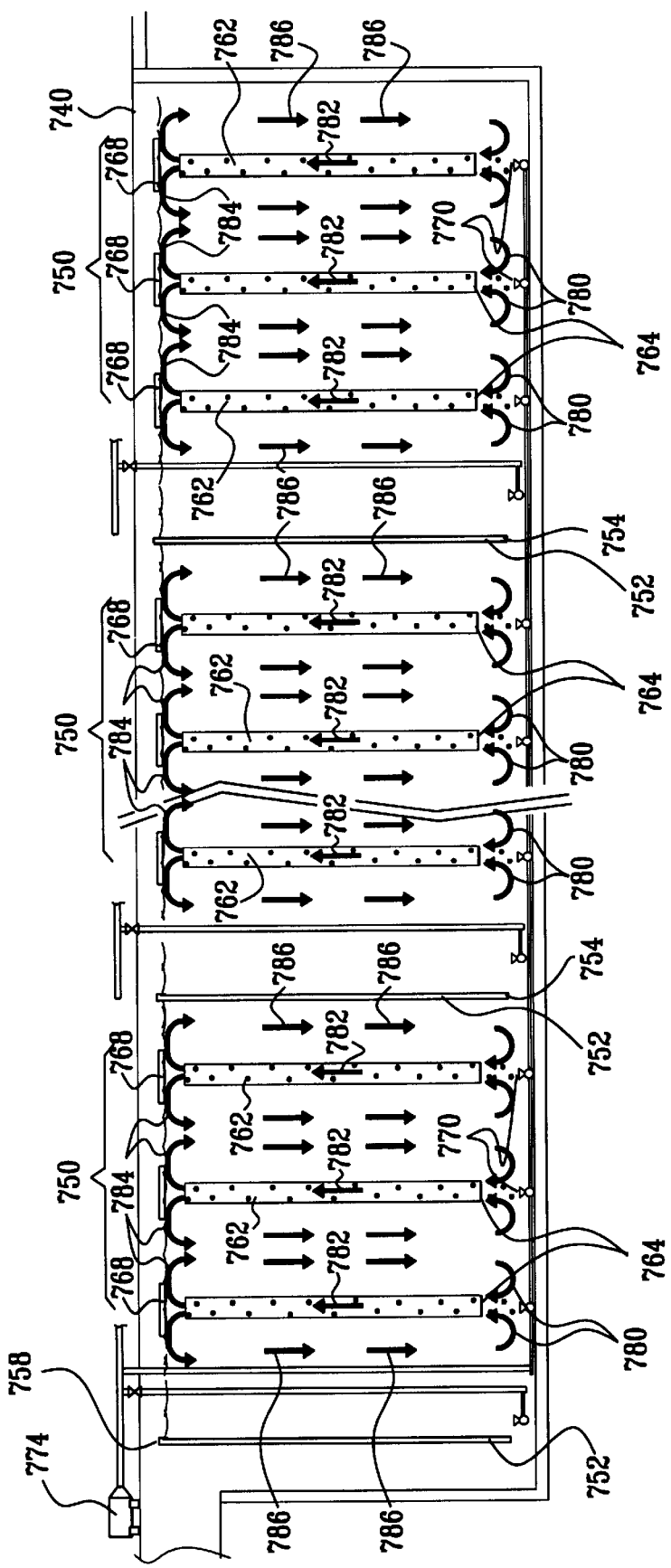
FIG. 13 is a sectional illustration corresponding to FIG. 12 and showing water flows.

Reference is now made to FIG. 13, which is a simplified illustration of the retrofit of FIGS. 11 and 12 showing water flows. As seen in FIG. 13, the air diffusers 770 underlying the hollow shafts 762 cause water to flow into the hollow shafts 762, as indicated by arrows 780 and upwardly through the hollow shafts, as indicated by arrows 782. The presence of deflectors 768 overlying each hollow shaft 762 causes the water exiting the tops of hollow shafts 762 to move sideways and downwardly, as indicated by arrows 784. The absence or lower density of air diffusers outside of shafts 762 allows water to flow downwardly, as indicated by arrows 786.

Figure 14:
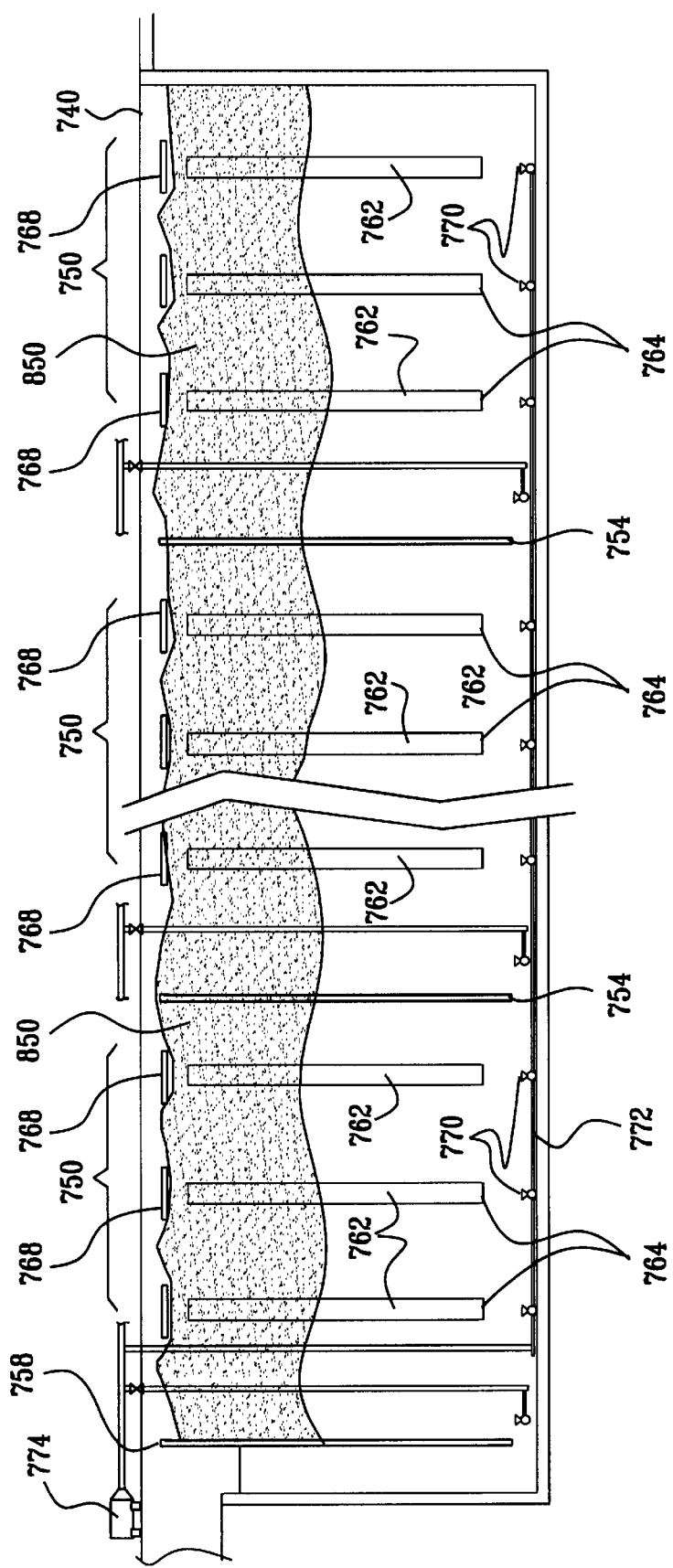
FIG. 14 is a sectional illustration corresponding to FIG. 12 and showing particles located in the retrofit of FIG. 11 in the absence of fluid flow.

Reference is now made to FIG. 14, which is a sectional illustration corresponding to FIG. 12 and showing particles 850 preferably located in the retrofit of FIG. 11 in the absence of fluid flow. Particles 850 are preferably floating porous plastic particles having a density lower than that of pure water, preferably having a specific gravity between 0.65 and 0.95. Typically, the particles have an irregular shape, whose largest dimension is approximately 4–10 mm and preferably about 6 mm. Preferably the particles have a total porosity exceeding 50% and a preferred mean pore diameter of pores, whose diameter exceeds 10 microns, of about 20 microns.

As seen in FIG. 14, preferably 10–40 percent of the volume of the basin is filled with particles 850 in the absence of water flow.

Figure 15:
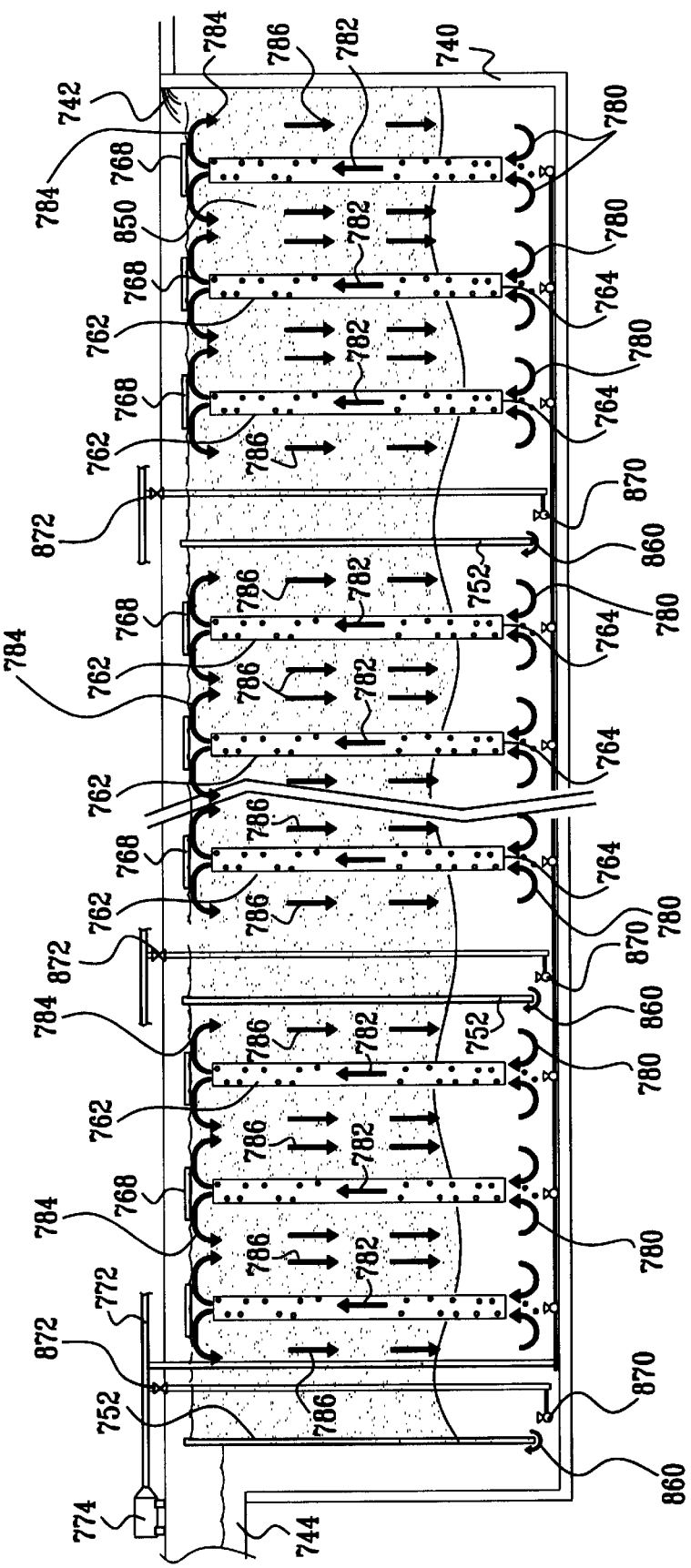
FIG. 15 is a sectional illustration corresponding to FIG. 14, showing water flows and fluidization of particles thereby.

Reference is now made to FIG. 15, which is a sectional illustration corresponding to FIG. 14 and showing water flows and fluidization of particles thereby. It is seen in FIG. 15, that due to the water flows, typified in FIG. 13, the volume of the bed of particles 850 increases substantially, as the bed of particles is fluidized. The particles 850 are generally constrained to reside outside of the hollow shafts 762, inasmuch as they generally do not reside as low in the basin 740 as the openings of shafts 762 at bottom locations 764 thereof.

When particles 850 become heavily coated with biomass, they do sometimes enter hollow shafts 762 and are sloughed of some of the biomass as they are propelled upwards by the action of the air lift provided thereby.

It is noted that in addition to the water flows indicated by arrows 780, 782, 784 and 786, there exists a continuous flow of water from the upstream side of the basin 740 from the waste water inlet 742 to the treated water outlet 744. This flow is a partially undulating flow and includes passage under partitions 752, as indicated by arrows 860. The passage under partitions 752 is of relatively low volume and generally does not carry floating particles 850 into the air lifts, thereby constraining the particles 850 to reside outside of and between the air lifts and preventing migration of particles across partitions 752.

It is appreciated that control of particle movement and prevention of particle migration may be assisted by ancillary air diffusers 870, disposed upstream of partitions 752. These air diffusers are connected via valves 872 and air conduits 772 to one or more air blowers 774.

Figure 16:
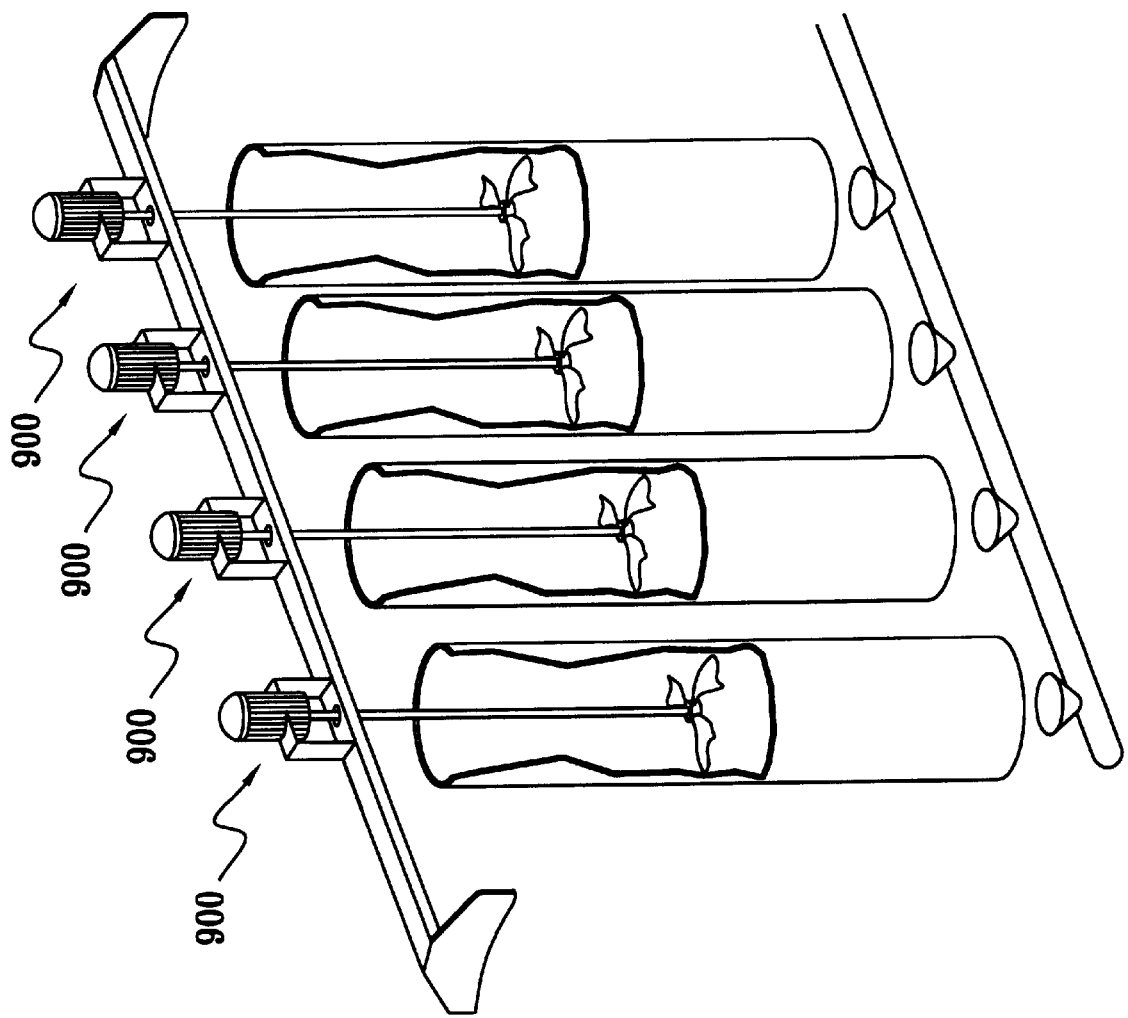
FIG. 16 is a simplified illustration of a denitrification unit useful in the embodiment of FIGS. 11–15.

Reference is now made to FIG. 16, which is a simplified illustration of a denitrification unit useful in the embodiment of FIGS. 11–15. De-nitrification units such as those shown in FIG. 16 may be installed instead of all of the air lifts 750 in a given process stage.

As seen in FIG. 16, a plurality of axial pumps 900 may provide lift without an air flow, as in the air lifts of FIGS. 11–15, thereby to provide an anoxic denitrification process.

Reference is now made to FIGS. 17A, 17B, 17C, 17D and 17E, which are simplified illustrations of examples of various embodiments of deflectors 768, useful in the embodiment of FIGS. 11–15.

Figure 17A:
FIGS. 17A, 17B, 17C, 17D and 17E are simplified illustrations of various deflectors useful in the embodiment of FIGS. 11–15.
Figure 17B:
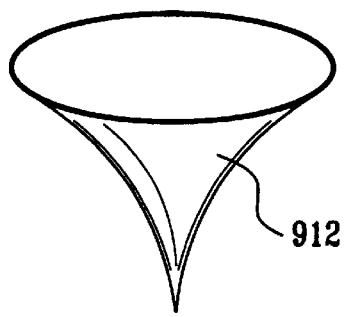
Figure 17C:
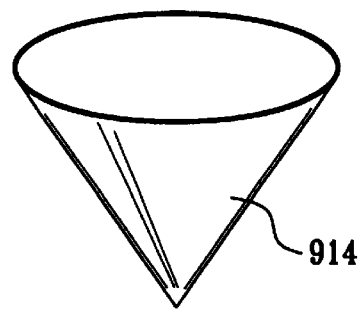
Figure 17D:
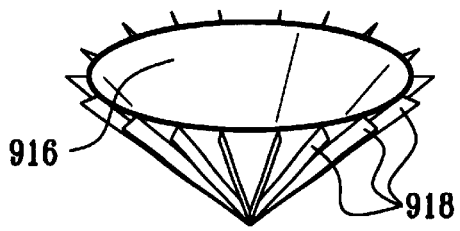
Figure 17E:
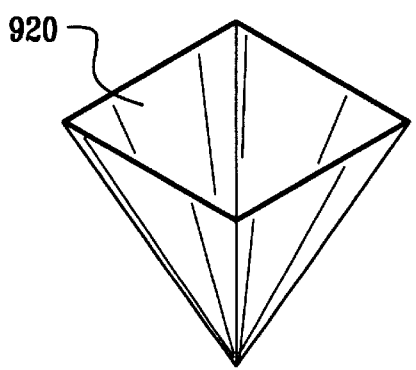

FIG. 17A shows a flat deflector 910, while FIG. 17B shows a curved deflector 912. FIG. 17 shows a conical deflector 914, while FIG. 17D shows a finned conical deflector 916, having fins 918. FIG. 17E shows a pyramidal deflector 920.

It will be appreciated by persons skilled in the art that the present invention is not limited by what has been particularly shown and described hereinabove. Rather the scope of the present invention includes both combinations and sub-combinations of the various features described hereinabove as well as variations and modifications which would occur to persons skilled in the art upon reading the specification and which are not in the prior art.

What is claimed is:

1. A method for retrofitting existing waste water treatment facilities having at least one existing basin comprising:

installing generally vertical partitions at spaced locations in said at least one existing basin in order to provide said at least one existing basin into a plurality of treatment stage regions;

installing at least one air lift in each of said plurality of treatment stage regions;

loading each of said plurality of treatment stage regions with a quantity of floatable porous particles;

supplying waste water to at least one of said plurality of treatment stage regions and allowing said waste water, but generally not said particles, to flow from at least one of said plurality of treatment stage regions to at least another of said plurality of treatment stage regions below at least one of said generally vertical partitions; and operating said at least one air lift in each of said plurality of treatment stage regions to provide aerobic waste water flow therein in operative engagement with said floatable porous particles, wherein:

said at least one air lift comprises a series of air lifts arranged in multiple process stages;

said series of air lifts includes an initial air lift assembly and at least one intermediate air lift assembly at each of said multiple process stages;

said initial air lift assembly includes an upstream partition which extends downwardly from a top location above a water level in said basin to a bottom location spaced from a bottom of said basin;

said supplying comprises providing a continuous flow of water from an upstream side of said basin from a waste water inlet to a treated water outlet; and said flow is an undulating flow and includes passage under said upstream partitions which is of relatively low volume and generally does not carry said floatable particles into said series of air lifts, thereby constraining said particles to reside outside of and between said series of air lifts.

2. A method according to claim 1 and wherein at least some of said vertical partitions are spaced from said bottom of said at least one basin in order to allow said waste water to flow thereunder between adjacent ones of said plurality of treatment stage regions.

3. A method according to claim 1 and wherein said at least one air lift comprises at least one air diffuser disposed underlying a peripheral enclosure which defines a column of water which is lifted by air diffusing upwardly from said at least one air diffuser therethrough.

4. A method according to claim 3 and wherein said peripheral enclosure comprises a cylindrical enclosure.

5. A method according to claim 3 and wherein said peripheral enclosure comprises a plurality of spaced generally vertical walls which extend between walls of the basin and are separated from the bottom of the basin.

6. A method according to claim 1 and wherein said floatable particles comprise porous plastic particles having a density lower than that of pure water.

7. A method according to claim 6 and wherein said particles have a specific gravity between 0.65 and 0.95.

8. A method according to claim 6 and wherein said particles have an irregular shape, whose largest dimension is generally between 4–10 mm.

9. A method according to claim 6 and wherein said particles have a total porosity exceeding 50%.

10. A method according to claim 6 and wherein said particles have a mean pore diameter of pores, whose diameter exceeds 10 microns, of about 20 microns.

11. A method according to claim 1 and wherein said generally vertical partitions divide said basin into between 4 and 12 process stages.

12. A method according to claim 1 and wherein said upstream partition extends fully from side to side of said basin.

13. A method according to claim 1 and wherein said initial air lift assembly also includes a downstream partition which extends fully from side to side of said basin but does not extend up to said water level.

14. A method according to claim 1 and wherein said intermediate air lift assembly includes an upstream partition which extends downwardly from a top location below said water level in said basin to a bottom location spaced from said bottom of said basin.

15. A method according to claim 1 and wherein said vertical partitions each extend fully from side to side of said basin.

16. A method according to claim 1 and wherein said installing also includes installing a final air lift assembly including an upstream partition which extends downwardly from a top location below said water level in said basin to a bottom location spaced from said bottom of said basin and extends fully from side to side of said basin.

17. A method according to claim 16 and wherein said final air lift assembly also includes a downstream partition which also extends fully from side to side of said basin and extends to a top location above said water level and closer to said bottom than does said upstream partition.

18. A method according to claim 17 and wherein said downstream partition is attached to a deflector plate which extends in an upstream direction from downstream partition at a location at said water level.

19. A method according to claim 1 and wherein:

said at least one air lift comprises a plurality of air lift assemblies each including upstream and downstream partitions:

a first plurality of air diffusers are disposed at said bottom of said basin intermediate upstream and downstream partitions of said plurality of air lift assemblies; and a second plurality of air diffusers, lesser in number than said first plurality of air diffusers, are disposed at said bottom of said basin intermediate said plurality of air lift assemblies.

20. A method according to claim 19 and wherein said first plurality of air diffusers intermediate said upstream and downstream partitions of each air lift assembly causes water to flow upward between said upstream and downstream partitions of each air lift assembly.

21. A method according to claim 20 and wherein said second plurality of air diffusers intermediate said plurality of air lift assemblies allows water to flow downward.

22. A method according to claim 19 and also comprising controlling the flow velocity of water by controlling operation of said first and second pluralities of air diffusers.

23. A method according to claim 1 and wherein said loading comprises loading 10–40 percent of the volume of said basin with said particles in absence of water flow.

24. A method according to claim 1 and wherein said at least one air lift includes an adjustable angle deflector.

25. A method according to claim 1 and wherein said at least one air lift includes an integral curved downstream partition and deflector.

26. A method according to claim 1 and also comprising installing a denitrification unit in at least one of said plurality of treatment stage regions.

27. A method according to claim 26 and wherein said denitrification unit comprises a plurality of axial pumps which provide lift generally without an air flow, thereby to provide an anoxic de-nitrification process.

28. A method according to claim 1 and wherein said at least one air lift comprises an array of air lifts and wherein said array of air lifts comprises a multiplicity of cylindrical air lifts arranged in said plurality of treatment stage regions and separated by said vertical partitions which extend from a bottom location which is spaced from a bottom of said basin by a first vertical separation.

29. A method according to claim 28 and wherein said cylindrical air lifts each comprise:
    a hollow shaft which extends from a bottom location spaced from a bottom of said basin by a second vertical separation which exceeds said first separation;
    a deflector which is disposed in spaced relationship over each hollow shaft and is disposed at said water level; and
    at least one air diffuser which is disposed underlying each hollow shaft to provide an air lift therethrough, thereby causing water to flow into said hollow shafts and upwardly through said hollow shafts, said deflectors causing said water exiting said tops of said hollow shafts to move sideways and downwardly.

30. A method according to claim 29 and also comprising:
    a plurality of air diffusers disposed immediately upstream of each said vertical partition for providing control of particle movement and prevention of particle migration.

31. A method according to claim 1 and wherein said operating produces fluidization of said particles.

32. A method according to claim 1 and wherein said operating is operative, when said particles become heavily coated with biomass, to cause said particles sometimes to enter said at least one air lift and to be sloughed of some of said biomass as they are propelled upwards by action of said at least one air lift.

33. A method for retrofitting existing waste water treatment facilities having at least one existing basin comprising:
    installing generally vertical partitions at spaced locations in said at least one existing basin in order to divide said at least one existing basin into a plurality of treatment stage regions;
    installing at least one air lift in each of said plurality of treatment stage regions;
    loading each of said plurality of treatment stage regions with a quantity of floatable porous particles;
    supplying waste water to at least one of said plurality of treatment stage regions and allowing said waste water, but generally not said particles, to flow from at least one of said plurality of treatment stage regions to at least another of said plurality of treatment stage regions; and
    operating said at least one air lift in each of said plurality of treatment stage regions to provide aerobic waste water flow therein in operative engagement with said floatable porous particles,
    and wherein said at least one air lift comprises a series of air lifts arranged in multiple process stages,
    and wherein said series of air lifts includes an initial air lift assembly and at least one intermediate air lift assembly at each of said multiple process stages,
    and wherein said initial air lift assembly includes an upstream partition which extends downwardly from a top location above a water level in said basin to a bottom location spaced from a bottom of said basin,
    and wherein said upstream partition is attached to a deflector which extends in a downstream direction from said upstream partition at said water level.

34. A method for retrofitting existing waste water treatment facilities having at least one existing basin comprising:
    installing generally vertical partitions at spaced locations in said at least one existing basin in order to divide said at least one existing basin into a plurality of treatment stage regions;
    installing at least one air lift in each of said plurality of treatment stage regions;
    loading each of said plurality of treatment stage regions with a quantity of floatable porous particles;
    supplying waste water to at least one of said plurality of treatment stage regions and allowing said waste water, but generally not said particles, to flow from at least one of said plurality of treatment stage regions to at least another of said plurality of treatment stage regions; and
    operating said at least one air lift in each of said plurality of treatment stage regions to provide aerobic waste water flow therein in operative engagement with said floatable porous particles,
    and wherein said at least one air lift comprises a series of air lifts arranged in multiple process stages,
    and wherein said series of air lifts includes an initial air lift assembly and at least one intermediate air lift assembly at each of said multiple process stages,
    and wherein said at least one intermediate air lift assembly comprises an upstream partition separated from a deflector plate which extends in a downstream direction from said upstream partition at a water level in said basin.

35. A method according to claim 34 and wherein said at least one intermediate air lift assembly also includes a downstream partition which does not extend up to said water level or as close to a bottom of said basin as does said upstream partition.

36. A method for waste water treatment employing at least one basin comprising:
    installing generally vertical partitions at spaced locations in said at least one basin in order to divide said at least one basin into a plurality of treatment stage regions;
    installing at least one air lift in each of said plurality of treatment stage regions;
    loading each of said plurality of treatment stage regions with a quantity of floatable porous particles;
    supplying waste water to at least one of said plurality of treatment stage regions and allowing said waste water, but generally not said particles, to flow from at least one of said plurality of treatment stage regions to at least another of said plurality of treatment stage regions below at least one of said generally vertical partitions; and
    operating said at least one air lift in each of said plurality of treatment stage regions to provide aerobic waste water flow therein in operative engagement with said floatable porous particles,
    wherein:
        said at least one air lift comprises a series of air lifts arranged in multiple process stages;
        said series of air lifts includes an initial air lift assembly and at least one intermediate air lift assembly at each of said multiple process stages;

said initial air lift assembly includes an upstream partition which extends downwardly from a top location above a water level in said basin to a bottom location spaced from a bottom of said basin;

said supplying comprises providing a continuous flow of water from an upstream side of said basin from a waste water inlet to a treated water outlet; and said flow is an undulating flow and includes passage under said upstream partitions which is of relatively low volume and generally does not carry said floatable particles into said series of air lifts, thereby constraining said particles to reside outside of and between said series of air lifts.

37. A method according to claim 36 and wherein at least some of said vertical partitions are spliced from said bottom of said at least one basin in order to allow said waste water to flow thereunder between adjacent ones of said plurality of treatment stage regions.

38. A method according to claim 36 and wherein said at least one air lift comprises at least one air diffuser disposed underlying a peripheral enclosure which defines a column of water which is lifted by air diffusing upwardly from said at least one air diffuser therethrough.

39. A method according to claim 38 and wherein said peripheral enclosure comprises a cylindrical enclosure.

40. A method according to claim 38 and wherein said peripheral enclosure comprises a plurality of spaced generally vertical walls which extend between walls of the basin and are separated from the bottom of the basin.

41. A method according to claim 36 and wherein said floatable particles comprise porous plastic particles having a density lower than that of pure water.

42. A method according to claim 41 and wherein said particles have a specific gravity between 0.65 and 0.95.

43. A method according to claim 41 and wherein said particles have an irregular shape, whose largest dimension is generally between 4–10 mm.

44. A method according to claim 41 and wherein said particles have a total porosity exceeding 50%.

45. A method according to claim 41 and wherein said particles have a mean pore diameter of pores, whose diameter exceeds 10 microns, of about 20 microns.

46. A method according to claim 36 and wherein said generally vertical partitions divide said basin into between 4 and 12 process stages.

47. A method according to claim 36 and wherein said upstream partition extends fully from side to side of said basin.

48. A method according to claim 36 and wherein said initial air lift assembly also includes a downstream partition which extends fully from side to side of said basin but does not extend up to aid water level.

49. A method according to claim 36 and wherein said intermediate air lift assembly includes an upstream partition which extends downwardly from a top location below said water level in said basin to a bottom location spaced from said bottom of said basin.

50. A method according to claim 36 and wherein said vertical partitions each extend fully from side to side of said basin.

51. A method according to claim 36 and wherein said installing also includes installing a final air lift assembly including an upstream partition which extends downwardly from a top location below the water level in said basin to a bottom location spaced from said bottom of said basin and extends fully from side to side of said basin.

52. A method according to claim 51 and wherein said final air lift assembly also includes a downstream partition which also extends filly from side to side of said basin and extends to a top location above said water level and closer to said bottom than does said upstream partition.

53. A method according to claim 52 and wherein said downstream partition is attached to a deflector plate which extends in an upstream direction from downstream partition at a location at the basin's water level.

54. A method according to claim 36 and wherein:

said at least one air lift comprises a plurality of air lift assemblies each including upstream and downstream partitions:

a first plurality of air diffusers are disposed at said bottom of said basin intermediate upstream and downstream partitions of said plurality of air lift assemblies; and a second plurality of air diffusers, lesser in number than said first plurality of air diffusers, are disposed at said bottom of said basin intermediate said plurality of air lift assemblies.

55. A method according to claim 54 and wherein said first plurality of air diffusers intermediate said upstream and downstream partitions of each air lift assembly causes water to flow upward between said upstream and downstream partitions of each air lift assembly.

56. A method according to claim 55 and wherein said second plurality of air diffusers intermediate said plurality of air lift assemblies allows water to flow downward.

57. A method according to claim 54 and also comprising controlling the flow velocity of water by controlling operation of said first and second pluralities of air diffusers.

58. A method according to claim 36 and wherein said loading comprises loading 10–40 percent of the volume of said basin with said particles in absence of water flow.

59. A method according to claim 36 and wherein said at least one air lift includes an adjustable angle deflector.

60. A method according to claim 36 and wherein said at least one air lift includes an integral curved downstream partition and deflector.

61. A method according to claim 36 and also comprising installing a denitrification unit in at least one of said plurality of treatment stage regions.

62. A method according to claim 61 and wherein said denitrification unit comprises a plurality of axial pumps which provide lift generally without an air flow, thereby to provide an anoxic de-nitrification process.

63. A method according to claim 36 and wherein said at least one air lift comprises an array of air lifts and wherein said array of air lifts comprises a multiplicity of cylindrical air lifts arranged in said plurality of treatment stage regions and separated by said vertical partitions which extend from a bottom location which is spaced from a bottom of said basin by a first vertical separation.

64. A method according to claim 63 and wherein said cylindrical air lifts each comprise:

a hollow shaft which extends from a bottom location spaced from a bottom of said basin by a second vertical separation which exceeds said first separation;

a deflector which is disposed in spaced relationship over each hollow shaft and is disposed at the basin's water level; and at least one air diffuser which is disposed underlying each hollow shaft to provide an air lift therethrough, thereby causing water to flow into said hollow shafts and upwardly through said hollow shafts, said deflectors causing said water exiting top portions of said hollow shafts to move sideways and downwardly.

65. A method according to claim 64 and also comprising:
a plurality of air diffusers disposed immediately upstream of each said vertical partition for providing control of particle movement and prevention of particle migration.

66. A method according to claim 36 and wherein said operating produces fluidization of said particles.

67. A method according to claim 36 and wherein said operating is operative, when said particles become heavily coated with biomass, to cause said particles sometimes to enter said at least one air lift and to be sloughed of some of said biomass as they are propelled upward by action of said at least one air lift.

68. A method for waste water treatment employing at least one basin comprising:
installing generally vertical partitions at spaced locations in said at least one basin in order to divide said at least one basin into a plurality of treatment stage regions;
installing at least one air lift in each of said plurality of treatment stage regions;
loading each of said plurality of treatment stage regions with a quantity of floatable porous particles;
supplying waste water to at least one of said plurality of treatment stage regions and allowing said waste water, but generally not said particles, to flow from at least one of said plurality of treatment stage regions to at least another of said plurality of treatment stage regions; and
operating said at least one air lift in each of said plurality of treatment stage regions to provide aerobic waste water flow therein in operative engagement with said floatable porous particles,
and wherein said at least one air lift comprises a series of air lifts arranged in multiple process stages,
and wherein said series of air lifts includes an initial air lift assembly and at least one intermediate air lift assembly at each of said multiple process stages,
and wherein said initial air lift assembly includes an upstream partition which extends downwardly from a top location above a water level in said basin to a bottom location spaced from a bottom of said basin,
and wherein said upstream partition is attached to a deflector which extends in a downstream direction from said upstream partition at said water level.

69. A method for waste water treatment employing at least one basin comprising:
installing generally vertical partitions at spaced locations in said at least one basin in order to divide said at least one basin into a plurality of treatment stage regions;
installing at least one air lift in each of said plurality of treatment stage regions;
loading each of said plurality of treatment stage regions with a quantity of floatable porous particles;
supplying waste water to at least one of said plurality of treatment stage regions and allowing said waste water, but generally not said particles, to flow from at least one of said plurality of treatment stage regions to at least another of said plurality of treatment stage regions; and
operating aid at least one air lift in each of said plurality of treatment stage regions to provide aerobic waste water flow therein in operative engagement with said floatable porous particles,
and wherein said at least one air lift comprises a series of air lifts arranged in multiple process stages,
and wherein said series of air lifts includes an initial air lift assembly and at least one intermediate air lift assembly at each of said multiple process stages,
and wherein said at least one intermediate air lift assembly comprises an upstream partition separated from a deflector plate which extends in a downstream direction from said upstream partition at a water level in said basin.

70. A method according to claim 69 and wherein said at least one intermediate air lift assembly also includes a downstream partition which does not extend up to said water level or as close to a bottom of said basin as does said upstream partition.

71. Retrofitted waste water treatment apparatus comprising:
at least one existing basin;
generally vertical partitions located at spaced locations in said at least one existing basin in order to divide said at least one existing basin into a plurality of treatment stage regions;
at least one air lift, located in each of said plurality of treatment stage regions, comprising a series of air lifts, arranged in each of multiple process stages, including:
an initial air lift assembly including an upstream partition which extends downwardly from top location above a water level in said existing basin to a bottom location spaced from a bottom of said existing basin; and
at least on intermediate air lift assembly; and
a quantity of floatable porous particles loaded into each of said plurality of treatment stage regions, whereby supplying waste water from an upstream side of said existing basin, by providing a continuous flow of water from a waste water inlet to a treated water outlet, to at least one of said plurality of treatment stage regions and allowing said waste water, but generally not said particles, to flow from at least one of said plurality of treatment stage regions to at least another of said plurality of treatment stage regions below at leas one of said generally vertical partitions and operating said at least one air lift in each of said plurality of treatment stage regions provides aerobic waste water flow therein in operative engagement with said floatable porous particles,
wherein said flow is an undulating flow and includes passage under said upstream partitions which is of relatively low volume and generally does not carry said floatable particles into said series of air lifts, thereby constraining said particles to reside outside of and between said series of air lifts.

72. Apparatus according to claim 71 and wherein at least some of said vertical partitions are spaced from said bottom of said at least one basin in order to allow said waste water to flow thereunder between adjacent ones of said plurality of treatment stage regions.

73. Apparatus according to claim 71 and wherein said at least one air lift comprises at least one air diffuser disposed underlying a peripheral enclosure which defines a column of water which is lifted by air diffusing upwardly from said at least one air diffuser therethrough.

74. Apparatus according to claim 73 and wherein said peripheral enclosure comprises a cylindrical enclosure.

75. Apparatus according to claim 73 and wherein said peripheral enclosure comprises a plurality of spaced generally vertical walls which extend between walls of the basin and are separated from the bottom of the basin.

76. Apparatus according to claim 71 and wherein said floatable particles comprise porous plastic particles having a density lower than that of pure water.

77. Apparatus according to claim 76 and wherein said particles have a specific gravity between 0.65 and 0.95.

78. Apparatus according to claim 76 and wherein said particles have an irregular shape, whose largest dimension is generally between 4–10 mm.

79. Apparatus according to claim 76 and wherein said particles have a total porosity exceeding 50%.

80. Apparatus according to claim 76 and wherein said particles have a mean pore diameter of pores, whose diameter exceeds 10 microns, of about 20 microns.

81. Apparatus according to claim 71 and wherein said generally vertical partitions divide said basin into between 4 and 12 process stages.

82. Apparatus according to claim 71 and wherein said upstream partition extends fully from side to side of said basin.

83. Apparatus according to claim 71 and wherein said initial air lift assembly also includes a downstream partition which extends fully from side to side of said basin but does not extend up to said water level.

84. Apparatus according to claim 71 and wherein said intermediate air lift assembly includes an upstream partition which extends downwardly from a top location below said water level in said basin to a bottom location spaced from said bottom of said basin.

85. Apparatus according to claim 71 and wherein said vertical partitions each extend fully from side to side of said basin.

86. Apparatus according to claim 71 and wherein said installing also includes installing a final air lift assembly including an upstream partition which extends downwardly from a top location below said water level in said basin to a bottom location spaced from said bottom of said basin and extends fully from side to side of said basin.

87. Apparatus according to claim 86 and wherein said final air lift assembly also includes a downstream partition which also extends fully from side to side of said basin and extends to a top location above said water level and closer to said bottom than does said upstream partition.

88. Apparatus according to claim 87 and wherein said downstream partition is attached to a deflector plate which extends in an upstream direction from downstream partition at a location at said water level.

89. Apparatus according to claim 71 and wherein:
said at least one air lift comprises a plurality of air lift assemblies each including upstream and downstream partitions:
 a first plurality of air diffusers are disposed at said bottom of said basin intermediate upstream and downstream partitions of said plurality of air lift assemblies; and
 a second plurality of air diffusers, lesser in number than said first plurality of air diffusers, are disposed at said bottom of said basin intermediate said plurality of air lift assemblies.

90. Apparatus according to claim 89 and wherein said first plurality of air diffusers intermediate said upstream and downstream partitions of each air lift assembly causes water to flow upward between said upstream and downstream partitions of each air lift assembly.

91. Apparatus according to claim 90 and wherein said second plurality of air diffusers intermediate said plurality of air lift assemblies allows water to flow downward.

92. Apparatus according to claim 89 and also comprising controlling the flow velocity of water by controlling operation of said first and second pluralities of air diffusers.

93. Apparatus according to claim 71 and wherein said floatable porous particles fill 10–40 percent of the volume of said basin in the absence of water flow.

94. Apparatus according to claim 71 and wherein said at least one air lift includes an adjustable angle deflector.

95. Apparatus according to claim 71 and wherein said at least one air lift includes an integral curved downstream partition and deflector.

96. Apparatus according to claim 71 and also comprising installing a denitrification unit in at least one of said plurality of treatment stage regions.

97. Apparatus according to claim 96 and wherein said denitrification unit comprises a plurality of axial pumps which provide lift generally without an air flow, thereby to provide an anoxic de-nitrification process.

98. Apparatus according to claim 71 and wherein said at least one air lift comprises an array of air lifts and wherein said array of air lifts comprises a multiplicity of cylindrical air lifts arranged in said plurality of treatment stage regions and separated by said vertical partitions which extend from a bottom location which is spaced from a bottom of said basin by a first vertical separation.

99. Apparatus according to claim 98 and wherein said cylindrical air lifts each comprise:
 a hollow shaft which extends from a bottom location spaced from a bottom of said basin by a second vertical separation which exceeds said first separation;
 a deflector which is disposed in spaced relationship over each hollow shaft and is disposed at said water level; and
 at least one air diffuser which is disposed underlying each hollow shaft to provide an air lift therethrough, thereby causing water to flow into said hollow shafts and upwardly through said hollow shafts, said deflectors causing said water exiting said tops of said hollow shafts to move sideways and downwardly.

100. Apparatus according to claim 99 and also comprising:
 a plurality of air diffusers disposed immediately upstream of each said vertical partition for providing control of particle movement and prevention of particle migration.

101. Apparatus according to claim 71 and wherein said at least one air lift produces fluidization of said particles.

102. Apparatus according to claim 71 and wherein said at least one air lift is operative, when said particles become heavily coated with biomass, to cause said particles sometimes to enter said at least one air lift and to be sloughed of some of said biomass as they are propelled upwards by action of said at least one air lift.

103. Retrofitted waste water treatment apparatus comprising:
 at least one existing basin;
 generally vertical partitions located at spaced locations in said at least one existing basin in order to divide said at least one existing basin into a plurality of treatment stage regions;
 at least one air lift, located in each of said plurality of treatment stage regions, comprising a series of air lifts arranged in each of multiple process stages, including:
  an initial air lift assembly including an upstream partition which extends downwardly from a top location above a water level in said basin to a bottom location spaced from a bottom of said basin; and
  at least one intermediate air lift assembly; and
 a quantity of floatable porous particles loaded into each of said plurality of treatment stage regions, whereby supplying waste water to at least one of said plurality of treatment stage regions and allowing said waste water, but generally not said particles, to flow from at least one of said plurality of treatment stage regions to at least another of said plurality of treatment stage regions and operating said at least one air lift in each of said plurality of treatment stage regions provides aerobic waste water flow therein in operative engagement with said floatable porous particles, and wherein said upstream partition is attached to a deflector which extends in a downstream direction from said upstream partition at said water level.

104. Retrofitted waste water treatment apparatus comprising:

at least one existing basin;

generally vertical partitions located at spaced locations in said at least one existing basin in order to divide said at least one existing basin into a plurality of treatment stage regions;

at least one air lift, located in each of said plurality of treatment stage regions, comprising a series of air lifts, arranged in each of multiple process stages, including:
 an initial air lift assembly; and
 at least one intermediate air lift assembly including an upstream partition separated from a deflector plate which extends in a downstream direction from said upstream partition at a water level in said basin; and a quantity of floatable porous particles loaded into each of said plurality of treatment stage regions, whereby supplying waste water to at least one of said plurality of treatment stage regions and allowing said waste water, but generally not said particles, to flow from at least one of said plurality of treatment stage regions to at least another of said plurality of treatment stage regions and operating said at least one air lift in each of said plurality of treatment stage regions provides aerobic waste water flow therein in operative engagement with said floatable porous particles.

105. Apparatus according to claim 104 and wherein said at least one intermediate air lift assembly also includes a downstream partition which does not extend up to said water level or as close to a bottom of said basin as does said upstream partition.

106. Waste water treatment apparatus comprising:

at least one basin;

generally vertical partitions located at spaced locations in said at least one basin in order to divide said at least one basin into a plurality of treatment stage regions;

at least one/air lift, located in each of said plurality of treatment stage regions, comprising a series of air lifts, arranged in each of multiple process stages, including:
 an initial air lift assembly including an upstream partition which extends downwardly from a top location above a water level in said basin to a bottom location spaced from a bottom of said basin; and
 at least one intermediate air lift assembly; and a quantity of floatable porous particles loaded into each of said plurality of treatment stage regions, whereby supplying waste water from an upstream side of said basin, by providing continuous flow of water from a waste water inlet to a treated water outlet, to at least one of said plurality of treatment stage regions and allowing said waste water, but generally not said particles, to flow from at least one of said plurality of treatment stage regions to at least another of said plurality of treatment stage regions below at least one of said generally vertical partitions and operating said at least one air lift in each of said plurality oft treatment stage regions provides aerobic waste water flow therein in operative engagement with said floatable porous particles, wherein said flow is an undulating flow and includes passage under said upstream partitions which is of relatively low volume and generally does not carry said floatable particles into said series of air lifts, thereby constraining said particles to reside outside of and between said series of air lifts.

107. Apparatus according to claim 106 and wherein at least some of said vertical partitions are spaced from said bottom of said at least one basin in order to allow said waste water to flow thereunder between adjacent ones of said plurality of treatment stage regions.

108. Apparatus according to claim 106 and wherein said at least one air lift comprises at least one air diffuser disposed underlying a peripheral enclosure which defines a column of water which is lifted by air diffusing upwardly from said at least one air diffuser therethrough.

109. Apparatus according to claim 108 and wherein said peripheral enclosure comprises a cylindrical enclosure.

110. Apparatus according to claim 108 and wherein said peripheral enclosure comprises a plurality of spaced generally vertical walls which extend between walls of the basin and are separated from the bottom of the basin.

111. Apparatus according to claim 106 and wherein said floatable particles comprise porous plastic particles having a density lower than that of pure water.

112. Apparatus according to claim 111 and wherein said particles have a specific gravity between 0.65 and 0.95.

113. Apparatus according to claim 111 and wherein said particles have an irregular shape, whose largest dimension is generally between 4–10 mm.

114. Apparatus according to claim 111 and wherein said particles have a total porosity exceeding 50%.

115. Apparatus according to claim 111 and wherein said particles have a mean pore diameter of pores, whose diameter exceeds 10 microns, of about 20 microns.

116. Apparatus according to claim 106 and wherein said generally vertical partitions divide said basin into between 4 and 12 process stages.

117. Apparatus according to claim 106 and wherein said upstream partition extends fully from side to side of said basin.

118. Apparatus according to claim 106 and wherein said initial air lift assembly also includes a downstream partition which extends fully from side to side of said basin but does not extend up to said water level.

119. Apparatus according to claim 106 and wherein said intermediate air lift assembly includes an upstream partition which extends downwardly from a top location below said water level in said basin to a bottom location spaced from said bottom of said basin.

120. Apparatus according to claim 106 and wherein said vertical partitions each extend fully from side to side of said basin.

121. Apparatus according to claim 106 and wherein said installing also includes installing a final air lift assembly including an upstream partition which extends downwardly from a top location below the water level in said basin to a bottom location spaced from said bottom of said basin and extends fully from side to side of said basin.

122. Apparatus according to claim 121 and wherein said final air lift assembly also includes a downstream partition which also extends fully from side to side of said basin and extends to a top location above the water level and closer to said bottom than does said upstream partition.

123. Apparatus according to claim 122 and wherein said downstream partition is attached to a deflector plate which extends in an upstream direction from downstream partition at a location at the water level.

124. Apparatus according to claim 106 and wherein:
said at least one air lift comprises a plurality of air lift assemblies each including upstream and downstream partitions:
a first plurality of air diffusers are disposed at said bottom of said basin intermediate upstream and downstream partitions of said plurality of air lift assemblies; and
a second plurality of air diffusers, lesser in number than said first plurality of air diffusers, are disposed at said bottom of said basin intermediate said plurality of air lift assemblies.

125. Apparatus according to claim 124 and wherein said first plurality of air diffusers intermediate said upstream and downstream partitions of each air lift assembly causes water to flow upward between said upstream and downstream partitions of each air lift assembly.

126. Apparatus according to claim 125 and wherein said second plurality of air diffusers intermediate said plurality of air lift assemblies allows water to flow downward.

127. Apparatus according to claim 124 and also comprising controlling the flow velocity of water by controlling operation of said first and second pluralities of air diffusers.

128. Apparatus according to claim 106 and wherein said floatable porous particles fill 10–40 percent of the volume of said basin in the absence of water flow.

129. Apparatus according to claim 106 and wherein said at least one air lift includes an adjustable angle deflector.

130. Apparatus according to claim 106 and wherein said at least one air lift includes an integral curved downstream partition and deflector.

131. Apparatus according to claim 106 and also comprising installing a denitrification unit in at least one of said plurality of treatment stage regions.

132. Apparatus according to claim 131 and wherein said denitrification unit comprises a plurality of axial pumps which provide lift generally without an air flow, thereby to provide an anoxic de-nitrification process.

133. Apparatus according to claim 106 and wherein said at least one air lift comprises an array of air lifts and wherein said array of air lifts comprises a multiplicity of cylindrical air lifts arranged in said plurality of treatment stage regions and separated by said vertical partitions which extend from a bottom location which is spaced from a bottom of said basin by a first vertical separation.

134. Apparatus according to claim 133 and wherein said cylindrical air lifts each comprise:
a hollow shaft which extends from a bottom location spaced from a bottom of said basin by a second vertical separation which exceeds said first separation;
a deflector which is disposed in spaced relationship over each hollow shaft and is disposed at said water level; and
at least one air diffuser which is disposed underlying each hollow shaft to provide an air lift therethrough, thereby causing water to flow into said hollow shafts and upwardly through said hollow shafts, said deflectors causing said water exiting said tops of said hollow shafts to move sideways and downwardly.

135. Apparatus according to claim 134 and also comprising:
a plurality of air diffusers disposed immediately upstream of each said vertical partition for providing control of particle movement and prevention of particle migration.

136. Apparatus according to claim 106 and wherein said at least one air lift produces fluidization of said particles.

137. Apparatus according to claim 106 and wherein said at least one air lift is operative, when said particles become heavily coated with biomass, to cause said particles sometimes to enter said at least one air lift and to be sloughed of some of said biomass as they are propelled upwards by action of said at least one air lift.

138. Waste water treatment apparatus comprising:
at least one basin;
generally vertical partitions located at spaced locations in said at least one basin in order to divide said at least one basin into a plurality of treatment stage regions;
at least one air lift, located in each of said plurality of treatment stage regions, comprising a series of air lifts arranged in each of multiple process stages, including:
an initial air lift assembly including an upstream partition which extends downwardly from a top location above a water level in said basin to a bottom location spaced from a bottom of said basin; and
at least one intermediate air lift assembly; and
a quantity of floatable porous particles loaded into each of said plurality of treatment stage regions, whereby supplying waste water to at least one of said plurality of treatment stage regions and allowing said waste water, but generally not said particles, to flow from at least one of said plurality of treatment stage regions to at least another of said plurality of treatment stage regions and operating said at least one air lift in each of said plurality of treatment stage regions provides aerobic waste water flow therein in operative engagement with said floatable porous particles,
and wherein said upstream partition is attached to a deflector which extends in a downstream direction from said upstream partition at said water level.

139. Waste water treatment apparatus comprising:
at least one basin;
generally vertical partitions located at spaced locations in said at least one basin in order to divide said at least one basin into a plurality of treatment stage regions;
at least one air lift, located in each of said plurality of treatment stage regions, comprising a series of air lifts, arranged in each of multiple process stages, including:
an initial air lift assembly; and
at least one intermediate air lift assembly including an upstream partition separated from a deflector plate which extends in a downstream direction from said upstream partition at a wafer level in said basin; and
a quantity of floatable porous particles loaded into each of said plurality of treatment stage regions, whereby supplying waste water to at least one of said plurality of treatment stage regions and allowing said waste water, but generally not said particles, to flow from at least one of said plurality of treatment stage regions to at least another of said plurality of treatment stage regions and operating said at least one air lift in each of said plurality of treatment stage regions provides aerobic waste water flow therein in operative engagement with said floatable porous particles.

140. Apparatus according to claim 139 and wherein said at least one intermediate air lift assembly also includes a downstream partition which does not extend up to said water level or as close to a bottom of said basin as does said upstream partition.

* * * * *